United States Patent
Deng

(10) Patent No.: US 10,716,123 B2
(45) Date of Patent: Jul. 14, 2020

(54) V2X MESSAGE COMMUNICATION METHOD AND APPARATUS

(71) Applicant: Huawei Technologies Co., Ltd., Shenzhen, Guangdong (CN)

(72) Inventor: Qiang Deng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 16/207,639

(22) Filed: Dec. 3, 2018

(65) Prior Publication Data

US 2019/0104530 A1    Apr. 4, 2019

Related U.S. Application Data

(63) Continuation of application No. PCT/CN2016/084678, filed on Jun. 3, 2016.

(51) Int. Cl.
   *H04W 72/08* (2009.01)
   *H04W 4/40* (2018.01)
   (Continued)

(52) U.S. Cl.
   CPC .......... *H04W 72/087* (2013.01); *H04W 4/40* (2018.02); *H04W 8/245* (2013.01);
   (Continued)

(58) Field of Classification Search
   None
   See application file for complete search history.

(56) References Cited

U.S. PATENT DOCUMENTS

2014/0226470 A1    8/2014 Kim
2014/0254560 A1*   9/2014 Kamel ............. H04W 36/0044
                                                370/332

(Continued)

FOREIGN PATENT DOCUMENTS

CN    101212339 A    7/2008
CN    102724663 A    10/2012
(Continued)

OTHER PUBLICATIONS

NEC, "Stage 2 CR: Implmenting Resource Request without DRB Setup", 3GPP TSG RAN WG3 Meeting #92 R3-161184, May 2016, 7 pages.

(Continued)

*Primary Examiner* — Eunsook Choi
(74) *Attorney, Agent, or Firm* — Fish & Richardson P.C.

(57) ABSTRACT

The present application provides a V2X message communication method and apparatus. The method performed by a terminal includes: sending a quality of service QoS request message to a network device; receiving QoS information of the terminal that is sent by the network device based on identification information of the terminal; obtaining, based on the QoS information, a QoS parameter corresponding to a message identifier of a to-be-sent V2X message; obtaining, based on the obtained QoS parameter, a radio resource used to send the to-be-sent V2X message; and sending the to-be-sent V2X message by using the obtained radio resource. QoS information of a V2X message of each terminal may be obtained from the network device. Therefore, when sending a to-be-sent V2X message in a V2X service, the terminal can find matching QoS information, thereby satisfying a communication quality requirement of the terminal for implementing the V2X service.

18 Claims, 14 Drawing Sheets

(51) Int. Cl.
*H04W 28/16* (2009.01)
*H04W 8/24* (2009.01)
*H04W 28/02* (2009.01)
*H04W 72/02* (2009.01)

(52) U.S. Cl.
CPC ....... *H04W 28/0263* (2013.01); *H04W 28/16* (2013.01); *H04W 72/02* (2013.01)

(56) References Cited

U.S. PATENT DOCUMENTS

| | | | | |
|---|---|---|---|---|
| 2015/0117347 | A1* | 4/2015 | Iwai | H04W 28/24 370/329 |
| 2015/0163042 | A1* | 6/2015 | Tsuda | H04L 1/0022 370/329 |
| 2015/0195374 | A1* | 7/2015 | Wang | H04L 65/601 709/219 |
| 2015/0271838 | A1* | 9/2015 | Szilagyi | H04W 72/1205 370/336 |
| 2015/0334721 | A1 | 11/2015 | Kim et al. | |
| 2016/0006606 | A1* | 1/2016 | Zhu | H04L 41/0803 370/338 |
| 2016/0183121 | A1* | 6/2016 | Kazmi | H04W 28/18 370/230 |
| 2016/0373956 | A1* | 12/2016 | Zhang | H04W 28/24 |
| 2017/0188355 | A1 | 6/2017 | Ma | |
| 2017/0265063 | A1* | 9/2017 | Xie | H04L 29/08 |

FOREIGN PATENT DOCUMENTS

| | | |
|---|---|---|
| CN | 103813458 A | 5/2014 |
| CN | 105246025 A | 1/2016 |
| CN | 105491667 A | 4/2016 |
| EP | 3182780 A1 | 6/2017 |
| WO | 2014012244 A1 | 1/2014 |

OTHER PUBLICATIONS

"3rd Generation Partnership Project; Technical Specification Group Services and System Aspects; Study on LTE support for Vehicle to Everything (V2X) services (Release 14)", 3GPP TR 22.885 V14.0.0, Dec. 2015, 50 pages.

"3rd Generation Partnership Project; Technical Specification Group Services and System Aspects; Study on architecture enhancements for LTE support of V2X services (Release 14)", 3GPP TR 23.785 V0.3.0, Apr. 2016, 37 pages.

3GPP TS 23.401 V13.6.1 (Mar. 2016), "3rd Generation Partnership Project;Technical Specification Group Services and System Aspects; General Packet Radio Service (GPRS) enhancements for Evolved Universal Terrestrial Radio Access Network (E-UTRAN) access (Release 13)," Mar. 2016, 365 pages.

Office Action issued in Chinese Application No. 201680083491.8 dated Mar. 11, 2020, 33 pages (with English translation).

\* cited by examiner

V2X MESSAGE COMMUNICATION METHOD AND APPARATUS

CROSS-REFERENCE TO RELATED APPLICATIONS

This application is a continuation of International Application No. PCT/CN2016/084678, filed on Jun. 3, 2016, the disclosure of which is hereby incorporated by reference in its entirety.

TECHNICAL FIELD

The present application relates to the field of communications technologies, and in particular, to a V2X message communication method and apparatus.

BACKGROUND

With rapid deployment of LTE (Long Term Evolution) networks in the whole world, a network base is provided for a growing number of services with low latencies, high data rates, and wide coverage. A typical service is the "Internet of Vehicles". In the Internet of Vehicles, each vehicle may be served as UE in an LTE network. In the Internet of Vehicles, vehicles are interconnected, so that safer driving experience and richer Internet access experience can be provided.

The 3GPP (3rd Generation Partnership Project) currently carries out research on an LTE network-based V2X (Vehicle to Everything) service. The V2X service includes V2V (Vehicle to Vehicle), V2I (vehicle to infrastructure), V2N (vehicle-to-network), and V2P (vehicle-to-pedestrian) scenarios. The V2V is communication between vehicles, the V2I and the V2N are communication between a vehicle and a roadside unit/network, and the V2P is communication between a vehicle and a person. Communication between devices for implementing the V2X service is mainly implemented by transmitting a V2X message between UEs of two parties of the V2X service. For example, a vehicle A informs another vehicle of information such as a speed/direction by sending a V2V message to the other vehicle. After receiving the V2V message, the other vehicle may determine, based on the message, whether to take a measure such as braking in advance.

Currently, communication quality parameters of V2X messages of all terminals are preconfigured on the terminals. This communication quality parameter setting manner is not flexible, and cannot satisfy a requirement of the terminal on communication quality in the V2X service.

SUMMARY

Embodiments of the present application provide a V2X message communication method and apparatus, to resolve a problem that a communication quality parameter setting manner of a terminal cannot satisfy a requirement of the terminal on communication quality in a V2X service.

To resolve the foregoing technical problem, the embodiments of the present application disclose the following technical solutions.

According to a first aspect, a V2X message communication method is provided. The method includes:

sending, by a terminal, a quality of service QoS request message to a network device, where the QoS request message carries identification information of the terminal;

receiving, by the terminal, QoS information of the terminal that is sent by the network device based on the identification information of the terminal, where the QoS information includes a message identifier of a V2X message supported by the terminal and a QoS parameter corresponding to the message identifier;

obtaining, by the terminal based on the QoS information, a QoS parameter corresponding to a message identifier of a to-be-sent V2X message;

obtaining, by the terminal based on the obtained QoS parameter, a radio resource used to send the to-be-sent V2X message; and sending, by the terminal, the to-be-sent V2X message by using the obtained radio resource.

With reference to the first aspect, in a first possible implementation of the first aspect, the message identifier includes:

at least one of a message type or a message flow template type.

With reference to the first aspect or the first possible implementation of the first aspect, in a second possible implementation of the first aspect, the QoS parameter includes at least one of a priority, a latency, reliability, or a bit rate.

With reference to the first aspect or the first or the second possible implementation of the first aspect, in a third possible implementation of the first aspect, the network device is a V2X service function entity or a mobility management entity MME.

With reference to the first aspect or the first or the second or the third possible implementation of the first aspect, in a fourth possible implementation of the first aspect, the obtaining, by the terminal based on the obtained QoS parameter, a radio resource used to send the to-be-sent V2X message includes:

obtaining, by the terminal based on a correspondence between a resource identifier and a QoS parameter, the resource identifier corresponding to the obtained QoS parameter, where the resource identifier in the correspondence is used to identify a pre-allocated radio resource; and determining, by the terminal, a radio resource identified by the obtained resource identifier as the radio resource used to send the to-be-sent V2X message.

With reference to the first aspect or the first or the second or the third possible implementation of the first aspect, in a fifth possible implementation of the first aspect, the obtaining, by the terminal based on the obtained QoS parameter, a radio resource used to send the to-be-sent V2X message includes:

sending, by the terminal, a resource request message to a base station, where the resource request message carries the obtained QoS parameter, the resource request message is used to request a resource identifier from the base station, and the resource identifier is a resource identifier of the radio resource used to send the to-be-sent V2X message;

receiving, by the terminal, the resource identifier sent by the base station; and determining, by the terminal, a radio resource identified by the resource identifier as the radio resource used to send the to-be-sent V2X message.

According to a second aspect, a V2X message communication method is provided. The method includes:

obtaining, by a terminal, a message identifier of a to-be-sent V2X message;

sending, by the terminal, a resource request message to a base station based on the obtained message identifier, where the resource request message is used to request a resource identifier from the base station, and the resource identifier is a resource identifier of a radio resource used to send the to-be-sent V2X message;

receiving, by the terminal, the resource identifier sent by the base station; and sending, by the terminal, the to-be-sent V2X message by using the radio resource identified by the resource identifier.

With reference to the second aspect, in a first possible implementation of the second aspect, the sending, by the terminal, a resource request message to a base station based on the obtained message identifier includes:

sending, by the terminal, the resource request message carrying the obtained message identifier to the base station.

With reference to the second aspect, in a second possible implementation of the second aspect, the sending, by the terminal, a resource request message to a base station based on the obtained message identifier includes:

determining, by the terminal based on a correspondence between a message identifier of a V2X message supported by the terminal and a bearer identifier of a radio bearer for communication between the terminal and the base station, a bearer identifier corresponding to the obtained message identifier; and sending, by the terminal, the resource request message to the base station by using a radio bearer identified by the determined bearer identifier.

According to a third aspect, a V2X message communication method is provided. The method includes:

receiving, by a network device, a quality of service QoS request message sent by a terminal, where the QoS request message carries identification information of the terminal;

obtaining, by the network device, QoS information of the terminal based on the identification information of the terminal, where the QoS information includes a message identifier of a V2X message supported by the terminal and a QoS parameter corresponding to the message identifier; and sending, by the network device, the QoS information of the terminal to the terminal.

With reference to the third aspect, in a first possible implementation of the third aspect, the message identifier includes:

at least one of a message type or a message flow template type.

With reference to the third aspect or the first possible implementation, in a second possible implementation of the third aspect, the QoS parameter includes a priority; and the QoS parameter further includes at least one of a latency, reliability, or a bit rate.

With reference to the third aspect or the first or the second possible implementation, in a third possible implementation of the third aspect, the network device is a V2X service function entity or a mobility management entity MME.

With reference to the third aspect or the first or the second or the third possible implementation, in a fourth possible implementation of the third aspect, the method further includes:

if the network device is a V2X service function entity, sending, by the network device, a correspondence between the message identifier of the V2X message supported by the terminal and a bearer identifier of a radio bearer for communication between the terminal and the base station to the terminal; or if the network device is an MME, allocating, by the network device, a radio bearer to the message identifier of the V2X message supported by the terminal in one or more radio bearers for communication between the terminal and the base station, creating a correspondence between the message identifier of the V2X message and a bearer identifier of the allocated radio bearer, and sending, by the network device, the correspondence to the terminal.

With reference to the third aspect or the first or the second or the third possible implementation, in a fifth possible implementation of the third aspect, the network device is an MME, the obtaining, by the network device, QoS information of the terminal based on the identification information of the terminal includes:

sending, by the MME, a first request message to a home subscriber server HSS, where the first request message carries the identification information of the terminal; and receiving, by the MME, the QoS information sent by the HSS based on the identification information of the terminal.

With reference to the third aspect or the first or the second or the third possible implementation, in a sixth possible implementation of the third aspect, the network device is a V2X service function entity, the obtaining, by the network device, QoS information of the terminal based on the identification information of the terminal includes:

if the V2X service function entity locally stores the QoS information of the terminal, obtaining, by the V2X service function entity, the QoS information of the terminal by searching for the locally stored QoS information of the terminal; or if the V2X service function entity does not locally store the QoS information of the terminal, sending, by the V2X service function entity, a first request message to an HSS, where the first request message carries the identification information of the terminal; and receiving, by the V2X service function entity, the QoS information sent by the HSS based on the identification information of the terminal.

According to a fourth aspect, a V2X message communication method is provided. The method includes:

receiving, by a network device, a quality of service QoS request message sent by a terminal, where the QoS request message carries identification information of the terminal;

obtaining, by the network device, QoS information of the terminal based on the identification information of the terminal; and sending, by the network device, the QoS information of the terminal to a base station, where the QoS information includes a message identifier of a V2X message supported by the terminal and a QoS parameter corresponding to the message identifier.

With reference to the fourth aspect, in a first possible implementation of the fourth aspect, the message identifier includes:

at least one of a message type or a message flow template type.

With reference to the fourth aspect or the first possible implementation, in a second possible implementation of the fourth aspect, the QoS parameter includes at least one of a priority, a latency, reliability, or a bit rate.

With reference to the fourth aspect or the first or the second possible implementation, in a third possible implementation of the fourth aspect, the network device is a V2X service function entity or a mobility management entity MME.

With reference to the fourth aspect or the first or the second or the third possible implementation, in a fourth possible implementation of the fourth aspect, the method further includes:

if the network device is a V2X service function entity, sending, by the network device, a correspondence between the message identifier of the V2X message supported by the terminal and a bearer identifier of a radio bearer for communication between the terminal and the base station to the base station; or if the network device is an MME, allocating, by the network device, a radio bearer to the message identifier of the V2X message supported by the terminal in one or more radio bearers for communication between the terminal and the base station, creating a correspondence between the message identifier of the V2X message and a bearer identifier of the allocated radio bearer, and sending, by the network device, the correspondence to the base station.

According to a fifth aspect, a V2X message communication method is provided. The method includes:

receiving, by a base station, a resource request message sent by a terminal, where the resource request message is used to request a radio resource for sending a to-be-sent V2X message of the terminal;

determining, by the base station based on the resource request message, the radio resource used to send the to-be-sent V2X message; and sending, by the base station, a resource identifier of the determined radio resource to the terminal.

With reference to the fifth aspect, in a first possible implementation of the fifth aspect, the resource request message carries a message identifier of the to-be-sent V2X message; and the determining, by the base station based on the resource request message, the radio resource used to send the to-be-sent V2X message includes:

obtaining, by the base station based on a correspondence between the message identifier of the to-be-sent V2X message and a QoS parameter, the QoS parameter corresponding to the message identifier of the to-be-sent V2X message; and obtaining, by the base station based on a correspondence between a QoS parameter and a radio resource, a radio resource corresponding to the obtained QoS parameter, and determining the obtained radio resource as the radio resource used to send the to-be-sent V2X message.

With reference to the fifth aspect, in a second possible implementation of the fifth aspect, the determining, by the base station based on the resource request message, the radio resource used to send the to-be-sent V2X message includes:

determining, by the base station, a bearer identifier of a radio bearer used to transmit the resource request message;

obtaining, by the base station based on a correspondence between a QoS parameter and a bearer identifier of a radio bearer for communication between the terminal and the base station, a QoS parameter corresponding to the determined bearer identifier; and obtaining, by the base station based on a correspondence between a QoS parameter and a radio resource, a radio resource corresponding to the obtained QoS parameter, and determining the obtained radio resource as the radio resource used to send the to-be-sent V2X message.

According to a sixth aspect, a V2X message communication apparatus is provided. The apparatus is applied to a terminal, and the apparatus includes a receiving unit, a sending unit, and a processing unit, the sending unit is configured to send a quality of service QoS request message to a network device, where the QoS request message carries identification information of the terminal;

the receiving unit is configured to receive QoS information of the terminal that is sent by the network device based on the identification information of the terminal, where the QoS information includes a message identifier of a V2X message supported by the terminal and a QoS parameter corresponding to the message identifier;

the processing unit is configured to: obtain, based on the QoS information received by the receiving unit, a QoS parameter corresponding to a message identifier of a to-be-sent V2X message; and obtain, based on the obtained QoS parameter, a radio resource used to send the to-be-sent V2X message; and the sending unit is further configured to send the to-be-sent V2X message by using the radio resource Obtained by the processing unit.

With reference to the sixth aspect, in a first possible implementation of the sixth aspect, the message identifier includes:

at least one of a message type or a message flow template type.

With reference to the sixth aspect or the first possible implementation, in a second possible implementation of the sixth aspect, the QoS parameter includes at least one of a priority, a latency, reliability, or a bit rate.

With reference to the sixth aspect or the first or the second possible implementation, in a third possible implementation of the sixth aspect, the network device is a V2X service function entity or a mobility management entity MME.

With reference to the sixth aspect or the first or the second or the third possible implementation, in a fourth possible implementation of the sixth aspect, when obtaining, based on the QoS parameter received by the receiving unit, the radio resource used to send the to-be-sent V2X message, the processing unit is specifically configured to:

obtain, based on a correspondence between a resource identifier and a QoS parameter, a resource identifier corresponding to the obtained QoS parameter, where the resource identifier in the correspondence is used to identify a pre-allocated radio resource; and determine a radio resource identified by the obtained resource identifier as the radio resource used to send the to-be-sent V2X message.

With reference to the sixth aspect or the first or the second or the third possible implementation, in a fifth possible implementation of the sixth aspect, the sending unit is further configured to send a resource request message to a base station, where the resource request message carries the obtained QoS parameter, the resource request message is used to request a resource identifier from the base station, and the resource identifier is a resource identifier of the radio resource used to send the to-be-sent V2X message;

the receiving unit is further configured to receive the resource identifier sent by the base station; and the processing unit is further configured to determine a radio resource identified by the resource identifier received by the receiving unit as the radio resource used to send the to-be-sent V2X message.

According to a seventh aspect, a V2X message communication apparatus is provided. The apparatus is applied to a terminal, and the apparatus includes a receiving unit, a sending unit, and a processing unit, the processing unit is configured to obtain a message identifier of a to-be-sent V2X message;

the sending unit is configured to send a resource request message to a base station based on the message identifier obtained by the processing unit, where the resource request message is used to request a resource identifier from the base station, and the resource identifier is a resource identifier of a radio resource used to send the to-be-sent V2X message;

the receiving unit is configured to receive the resource identifier sent by the base station; and the sending unit is further configured to send the to-be-sent V2X message by using the radio resource identified by the resource identifier received by the receiving unit.

With reference to the seventh aspect, in a first possible implementation of the seventh aspect, when sending the resource request message to the base station based on the obtained message identifier, the sending unit is specifically configured to:

send the resource request message carrying the obtained message identifier to the base station.

With reference to the seventh aspect, in a second possible implementation of the seventh aspect, when sending the resource request message to the base station based on the obtained message identifier, the sending unit is specifically configured to:

determine, based on a correspondence between a message identifier of a V2X message supported by the terminal and a bearer identifier of a radio bearer for communication between the terminal and the base station, a bearer identifier corresponding to the obtained message identifier; and send the resource request message to the base station by using a radio bearer identified by the determined bearer identifier.

According to an eighth aspect, a V2X message communication apparatus is provided. The apparatus is applied to a network device, and the apparatus includes a receiving unit, a sending unit, and a processing unit, the receiving unit is configured to receive a quality of service QoS request message sent by a terminal, where the QoS request message carries identification information of the terminal;

the processing unit is configured to obtain quality of service QoS information of the terminal based on the identification information of the terminal that is carried in the QoS request message received by the receiving unit, where the QoS information includes a message identifier of a V2X message supported by the terminal and a QoS parameter corresponding to the message identifier; and the sending unit is configured to send the QoS information of the terminal to the terminal.

With reference to the eighth aspect, in a first possible implementation of the eighth aspect, the message identifier includes:

at least one of a message type or a message flow template type.

With reference to the eighth aspect or the first possible implementation, in a second possible implementation of the eighth aspect, the QoS parameter includes at least one of a priority, a latency, reliability, or a bit rate.

With reference to the eighth aspect or the first or the second possible implementation, in a third possible implementation of the eighth aspect, the network device is a V2X service function entity or a mobility management entity MME.

With reference to the eighth aspect or the first or the second or the third possible implementation, in a fourth possible implementation of the eighth aspect, if the network device is a V2X service function entity, the sending unit is further configured to send a correspondence between the message identifier of the V2X message supported by the terminal and a bearer identifier of a radio bearer for communication between the terminal and the base station to the terminal; or if the network device is an MME, the processing unit is further configured to: allocate a radio bearer to the message identifier of the V2X message supported by the terminal in one or more radio bearers for communication between the terminal and the base station, and create a correspondence between the message identifier of the V2X message and a bearer identifier of the allocated radio bearer; and the sending unit is further configured to send the correspondence to the terminal.

With reference to the eighth aspect or the first or the second or the third possible implementation, in a fifth possible implementation of the eighth aspect, the network device is an MME, when obtaining the QoS information of the terminal based on the identification information of the terminal that is carried in the QoS request message received by the receiving unit, the processing unit is specifically configured to:

send a first request message to a home subscriber server HSS, where the first request message carries the identification information of the terminal; and receive the QoS information sent by the HSS based on the identification information of the terminal.

With reference to the eighth aspect or the first or the second or the third possible implementation, in a sixth possible implementation of the eighth aspect, the network device is a V2X service function entity, when obtaining the QoS information of the terminal based on the identification information of the terminal that is carried in the QoS request message received by the receiving unit, the processing unit is specifically configured to:

if the V2X service function entity locally stores the QoS information of the terminal, obtain the QoS information of the terminal by searching for the locally stored QoS information of the terminal; or if the V2X service function entity does not locally store the QoS information of the terminal, send a first request message to an HSS, where the first request message carries the identification information of the terminal; and receive the QoS information sent by the HSS based on the identification information of the terminal.

According to a ninth aspect, a V2X message communication apparatus is provided. The apparatus is applied to a network device, and the apparatus includes a receiving unit, a sending unit, and a processing unit, the receiving unit is configured to receive a quality of service QoS request message sent by a terminal, where the QoS request message carries identification information of the terminal;

the processing unit is configured to obtain QoS information of the terminal based on the identification information of the terminal that is carried in the QoS request message received by the receiving unit; and the sending unit is configured to send the QoS information of the terminal that is obtained by the processing unit to a base station, where the QoS information includes a message identifier of a V2X message supported by the terminal and a QoS parameter corresponding to the message identifier.

With reference to the ninth aspect, in a first possible implementation of the ninth aspect, the message identifier includes:

at least one of a message type or a message flow template type.

With reference to the ninth aspect or the first possible implementation, in a second possible implementation of the ninth aspect, the QoS parameter includes at least one of a priority, a latency, reliability, or a bit rate.

With reference to the ninth aspect or the first or the second possible implementation, in a third possible implementation of the ninth aspect, the network device is a V2X service function entity or a mobility management entity MME.

With reference to the ninth aspect or the first or the second or the third possible implementation, in a fourth possible implementation of the ninth aspect, if the network device is a V2X service function entity, the sending unit is further configured to send a correspondence between the message identifier of the V2X message supported by the terminal and a bearer identifier of a radio bearer for communication between the terminal and the base station to the base station; or if the network device is an MME, the processing unit is further configured to: allocate a radio bearer to the message identifier of the V2X message supported by the terminal in one or more radio bearers for communication between the terminal and the base station, and create a correspondence between the message identifier of the V2X message and a bearer identifier of the allocated bearer; and the sending unit is further configured to send the correspondence to the base station.

According to a tenth aspect, a V2X message communication apparatus is provided. The apparatus is applied to a base station, and the apparatus includes a receiving unit, a sending unit, and a processing unit, the receiving unit is configured to receive a resource request message sent by a terminal, where the resource request message is used to request a radio resource for sending a to-be-sent V2X message of the terminal;

the processing unit is configured to determine, based on the resource request message received by the receiving unit, the radio resource used to send the to-be-sent V2X message; and the sending unit is configured to send a resource identifier of the radio resource determined by the processing unit to the terminal.

With reference to the tenth aspect, in a first possible implementation of the tenth aspect, the resource request message carries a message identifier of the to-be-sent V2X message; and when determining, based on the resource request message received by the receiving unit, the radio resource used to send the to-be-sent V2X message, the processing unit is specifically configured to:

obtain, based on a correspondence between the message identifier of the to-be-sent V2X message and a QoS parameter, the QoS parameter corresponding to the message identifier of the to-be-sent V2X message; obtain, based on a correspondence between a QoS parameter and a radio resource, the radio resource corresponding to the obtained QoS parameter; and determine the obtained radio resource as the radio resource used to send the to-be-sent V2X message.

With reference to the tenth aspect, in a second possible implementation of the tenth aspect, when determining, based on the resource request message received by the receiving unit, the radio resource used to send the to-be-sent V2X message, the processing unit is specifically configured to:

determine a bearer identifier of a radio bearer used to transmit the resource request message; obtain, based on a correspondence between a QoS parameter and a bearer identifier of a radio bearer for communication between the terminal and the base station, a QoS parameter corresponding to the determined bearer identifier; obtain, based on a correspondence between a QoS parameter and a radio resource, a radio resource corresponding to the obtained QoS parameter; and determine the obtained radio resource as the radio resource used to send the to-be-sent V2X message.

The technical solutions provided in the embodiments of the present application may include the following beneficial effects:

According to the method provided in the embodiments of the present application, terminals may obtain QoS information respectively corresponding to the terminals from a network device, and the QoS information includes a correspondence between a message identifier of a V2X message supported by the terminal and a QoS parameter of each message identifier, so that when sending a to-be-sent V2X message, the terminal can find a target QoS parameter matching the to-be-sent V2X message from the QoS information, search a preset correspondence between the QoS parameter and a radio resource for the target radio resource corresponding to the target QoS parameter, and use the target radio resource as a radio resource of the to-be-sent V2X message.

Because the QoS information of the V2X message of each terminal may be obtained from the network device, a communication quality parameter of the terminal does not need to be preset in the terminal, that is, the terminal may obtain customized QoS information of the V2X message from a network, so that when sending a to-be-sent V2X message in a V2X service, the terminal can find matching QoS information, thereby satisfying a communication quality requirement of the terminal for implementing the V2X service.

It should be understood that the foregoing general descriptions and the following detailed descriptions are merely examples and explanations, and cannot limit the present application.

BRIEF DESCRIPTION OF DRAWINGS

The accompanying drawings herein are incorporated the specification, constitute a part of this specification, show embodiments that are in accordance with the present application, and are used with this specification to explain a principle of the present application.

To describe the technical solutions in the embodiments of the present application more clearly, the following briefly describes the accompanying drawings required for describing the embodiments or the prior art. Apparently, a person of ordinary skill in the art may derive other drawings from these accompanying drawings without creative efforts.

DESCRIPTION OF EMBODIMENTS

Example embodiments are described in detail herein, and examples of the example embodiments are presented in the accompanying drawings. When the following descriptions relate to the accompanying drawings, unless otherwise specified, same numbers in different accompanying drawings represent a same element or similar elements. Implementations described in the following example embodiments do not represent all implementations consistent with the present application. On the contrary, they are only examples of apparatuses and methods that are described in the appended claims in detail and that are consistent with some aspects of the present application.

A V2X communication method provided in the embodiments of the present application may be applied to a system in which terminals can directly communicate with each other, for example, an LTE system.

Figure 1:
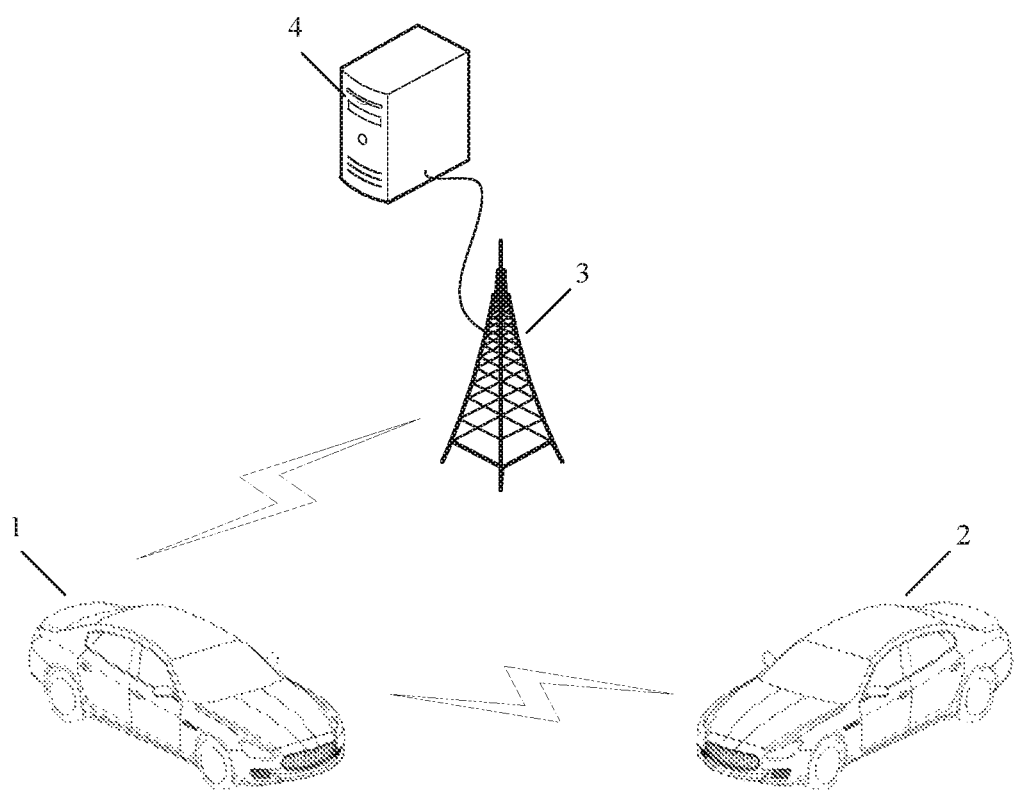
FIG. 1 is a schematic diagram of a scenario according to an embodiment of the present application.

FIG. 1 is a schematic diagram of a scenario according to an embodiment of the present application. As shown in FIG. 1, the scenario includes a first terminal 1, a second terminal 2, a base station 3, and a network device 4. Each of the first terminal 1 and the second terminal 2 is a device that can support a V2X service communications function, for example, an in-vehicle terminal or an in-vehicle navigation device. The first terminal 1 and the second terminal may directly communicate with each other by using a PC5 interface without using a network.

The network device 4 may be an MME (mobility management entity), an HSS (home subscriber server), or a V2X service function entity. The V2X service function entity may be a device such as a server or a cloud server.

Figure 2:
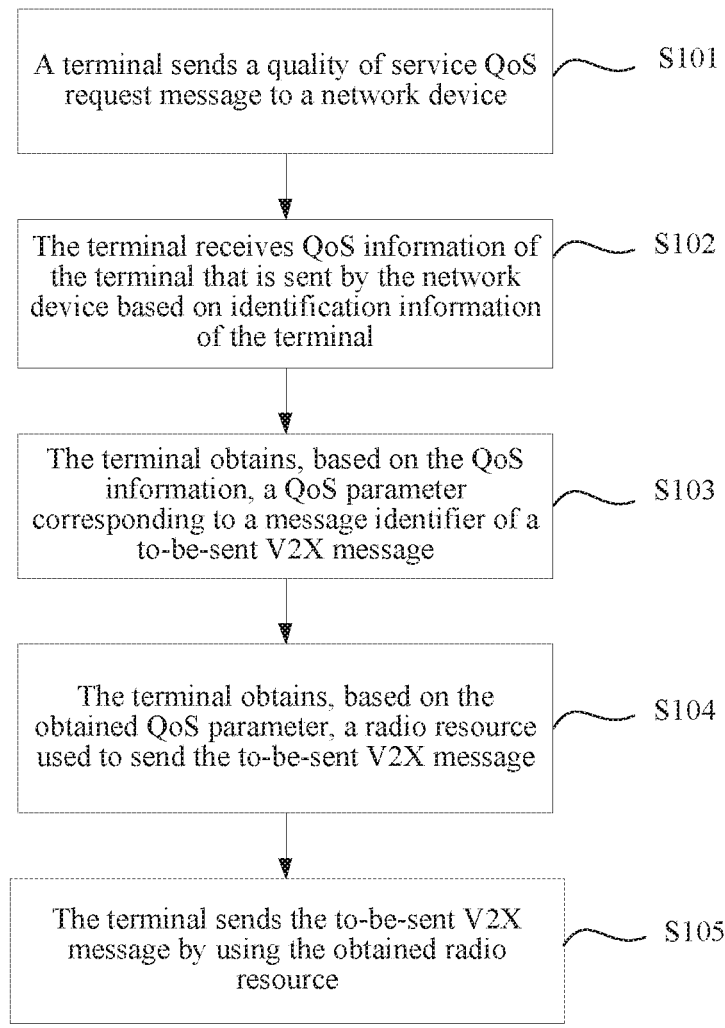
FIG. 2 is a schematic flowchart of a V2X communication method according to an embodiment of the present application.

An embodiment of the present application provides a V2X communication method. The method may be applied to the first terminal 1 or the second terminal 2 shown in FIG. 1. In this embodiment of the present application, regardless of whether the method is applied to the first terminal or the second terminal, the terminal is used as an example for description. As shown in FIG. 2, the method may include the following steps.

S101: The terminal sends a quality of service QoS request message to a network device.

In this embodiment of the present application, the network device may be an MME or a V2X service function entity. When the network device is the MME, the terminal may send the QoS request message to the MME by using an NAS (non-access stratum) message (such as an attach request). When the network device is the V2X service function entity, the terminal may forward the QoS request message to the V2X service function entity by using a base station.

The QoS request message carries identification information of the terminal, and the identification information of the terminal is used to identify the terminal. In this embodiment of the present application, the identification information of the terminal may include a terminal ID or other information used to identify the terminal, for example, an IMEI (International Mobile Equipment Identity). The QoS request message is used to request the network device to search for and send the QoS information of the terminal.

S102: The terminal receives QoS information of the terminal that is sent by the network device based on identification information of the terminal.

The QoS information may include a message identifier of a V2X message supported by the terminal and a QoS parameter corresponding to the message identifier.

The message identifier is used to identify a V2X message sent by the terminal. In this embodiment of the present application, the message identifier may include at least one of a message type or a message flow template (MFT) type. The message identifier may alternatively be a packet header or other information that can identify the V2X message.

In this embodiment of the present application, the QoS parameter includes at least one of a priority, a latency, reliability, or a bit rate. In an embodiment, the QoS parameter may include only the priority. In another embodiment, the QoS parameter may include the priority, and the QoS parameter may further include at least one of the latency, the reliability, or the bit rate.

A same terminal may need different QoS parameters for sending different V2X messages. In the QoS information corresponding to the identification information of the terminal, a plurality of message identifiers may be preset as required. Each message identifier corresponds to a QoS parameter. For example, the QoS information exists in a form of a correspondence table between the message identifier and the QoS parameter of each message identifier. In this way, when receiving the QoS information, the terminal may rapidly find a corresponding QoS parameter from the correspondence table based on a message identifier of a to-be-sent V2X message.

S103: The terminal obtains, based on the QoS information, a QoS parameter corresponding to a message identifier of a to-be-sent V2X message.

After generating the to-be-sent V2X message, the terminal may obtain the message identifier from the to-be-sent V2X message. In addition, the terminal may alternatively obtain the message identifier based on a process of generating the to-be-sent V2X message. Regardless of the message identifier obtaining manner, referring to the foregoing descriptions of step S102, the terminal can rapidly find the QoS parameter corresponding to the message identifier from the correspondence table of the QoS information.

S104: The terminal obtains, based on the obtained QoS parameter, a radio resource used to send the to-be-sent V2X message.

In this embodiment of the present application, the base station may pre-allocate corresponding radio resources to different QoS parameters, and the base station may pre-send correspondences between the QoS parameters and the radio resources to the terminal. In the terminal, the pre-allocated radio resources may be stored in a form of a resource pool. Therefore, when finding the QoS parameter of the to-be-sent V2X message, the terminal may search, by using the correspondences between the QoS parameters and the radio resources, for the radio resource used to send the to-be-sent V2X message.

In an embodiment of the present application, step S104 may include the following steps.

S1041: The terminal obtains, based on a correspondence between a resource identifier and a QoS parameter, a resource identifier corresponding to the obtained QoS parameter.

The resource identifier in the correspondence is used to identify a pre-allocated radio resource.

S1042: The terminal determines a radio resource identified by the obtained resource identifier as the radio resource used to send the to-be-sent V2X message.

S105: The terminal sends the to-be-sent V2X message by using the obtained radio resource.

After the terminal finds the radio resource corresponding to the to-be-sent V2X message in step S104, the terminal may send out the to-be-sent V2X message by using the radio resource, so that another terminal can receive the V2X message, thereby implementing a V2X service.

According to the method provided in this embodiment of the present application, terminals may obtain QoS information respectively corresponding to the terminals from a network device, and the QoS information includes a correspondence between a message identifier of a V2X message supported by the terminal and a QoS parameter of each message identifier, so that when sending a to-be-sent V2X message, the terminal can find a QoS parameter matching the to-be-sent V2X message from the QoS information, search a preset correspondence between a QoS parameter and a radio resource for the radio resource corresponding to the QoS parameter, and use the radio resource corresponding to the QoS parameter as a radio resource of the to-be-sent V2X message.

Because the QoS information of the V2X message of each terminal may be obtained from the network device, a communication quality parameter of the terminal does not need to be preset in the terminal, that is, the terminal may obtain customized QoS information of the V2X message from a network, so that when sending a to-be-sent V2X message in a V2X service, the terminal can find matching QoS information, thereby satisfying a communication quality requirement of the terminal for implementing the V2X service.

Figure 3:
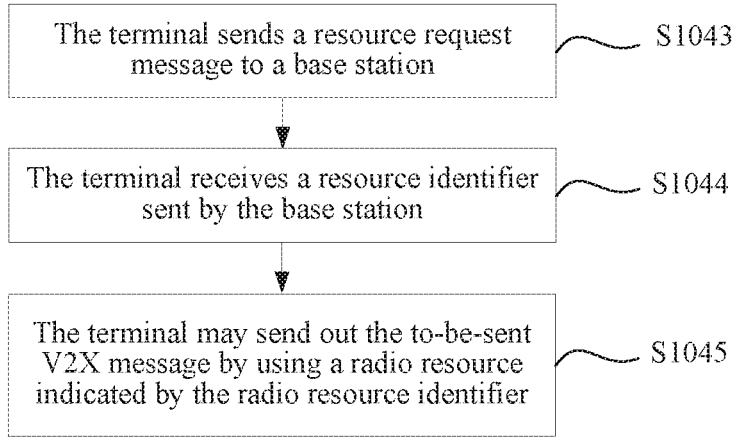
FIG. 3 is a schematic flowchart of another V2X communication method according to an embodiment of the present application.

In an embodiment shown in FIG. 2, the terminal may prestore resource information between the QoS parameter and the pre-allocated radio resource. In another embodiment, the terminal may not prestore the resource information. Therefore, the terminal needs to obtain the radio resource in another manner. As shown in FIG. 3, based on the embodiment shown in FIG. 2, step S104 in the method may include the following steps.

S1043: The terminal sends a resource request message to a base station.

The resource request message carries the obtained QoS parameter, the resource request message is used to request a resource identifier from the base station, and the resource identifier is a resource identifier of the radio resource used to send the to-be-sent V2X message.

S1044: The terminal receives a resource identifier sent by the base station.

In this embodiment of the present application, the base station may pre-allocate corresponding radio resources to different QoS parameters, and the base station may store correspondences between the QoS parameters and the radio resources in a form of a resource pool. Correspondingly, when receiving the QoS parameter sent by the terminal, the base station may search the resource pool for the resource identifier of the corresponding radio resource.

After receiving the radio resource identifier, in step S1045, the terminal may send out the to-be-sent V2X message by using the radio resource identified by the radio resource identifier.

A difference between this embodiment of the present application and the embodiment in FIG. 2 lies in that manners of determining the radio resource by the terminal are different. In the embodiment shown in FIG. 2, the terminal prestores the resource pool. Therefore, after determining the QoS parameter, the terminal can find the radio resource in the locally stored resource pool of the terminal. However, in the embodiment shown in FIG. 3, the terminal does not locally prestore the resource pool. Therefore, the base station needs to find the radio resource identifier corresponding to the to-be-sent V2X message, and then sends the radio resource identifier to the terminal. In either the manner in FIG. 2 or the manner in FIG. 3, the terminal can find the matching radio resource for the to-be-sent V2X message, thereby satisfying a communication quality requirement of the to-be-sent V2X message.

In the embodiments shown in FIG. 2 and FIG. 3, the terminal needs to obtain the QoS information of the terminal from the network device first, so that before sending the V2X message, the terminal can determine, by using the QoS information, the radio resource satisfying the communication quality requirement of the V2X message. However, in this case, the terminal needs to pre-obtain the QoS information of the terminal from the network device, that is, before sending the V2X message, the terminal needs to obtain the QoS information by temporarily interacting with the network device. Limited by impact such as a network latency or a packet loss, V2X message sending real-time performance is reduced.

Therefore, in another embodiment of the present application, the network device may further send related information of the to-be-sent V2X message to the base station. Because a speed and quality of communication between the terminal and the base station need to be much greater than a speed and quality of communication between the terminal and the network device, when needing to send the V2X message, the terminal may rapidly obtain the radio resource required by the to-be-sent V2X message from the base station.

Figure 4:
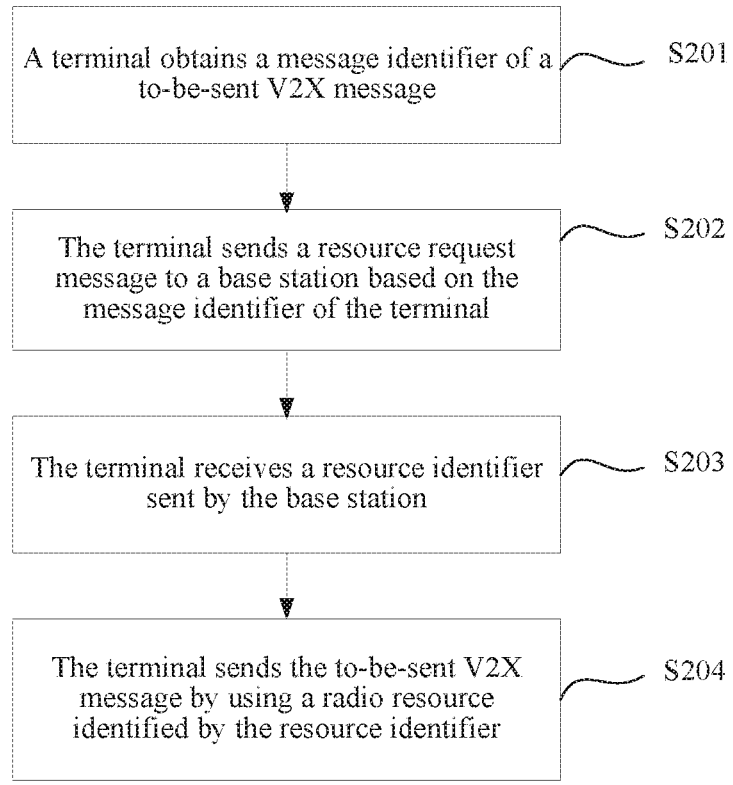
FIG. 4 is a schematic flowchart of still another V2X communication method according to an embodiment of the present application.

Correspondingly, in another embodiment of the present application, a V2X communication method is further provided. As shown in FIG. 4, the method may include the following steps.

S201: A terminal obtains a message identifier of a to-be-sent V2X message.

The terminal may obtain the message identifier from the to-be-sent V2X message. In addition, the terminal may alternatively determine the message identifier based on an object of the to-be-sent V2X message.

S202: The terminal sends a resource request message to a base station based on the message identifier of the terminal.

In this embodiment of the present application, the resource request message is used to enable the base station to obtain a resource identifier, and the resource identifier is used to instruct the terminal to send a radio resource of the to-be-sent V2X message.

The sending a resource request message to a base station based on the message identifier means that there is a correspondence between the resource request message and the message identifier. For example, the resource request message may include the message identifier.

In addition, the correspondence between the resource request message and the message identifier may alternatively be established in another manner. For example, a correspondence between each message identifier and a bearer identifier is pre-established. In this way, the resource request message may be sent by using the bearer identifier corresponding to the message identifier. Correspondingly, the base station also stores the correspondence between the message identifier and the bearer identifier, so that the base station may determine, by using a bearer identifier of a radio bearer for sending the resource request, the message identifier corresponding to the resource request message.

Figure 5:
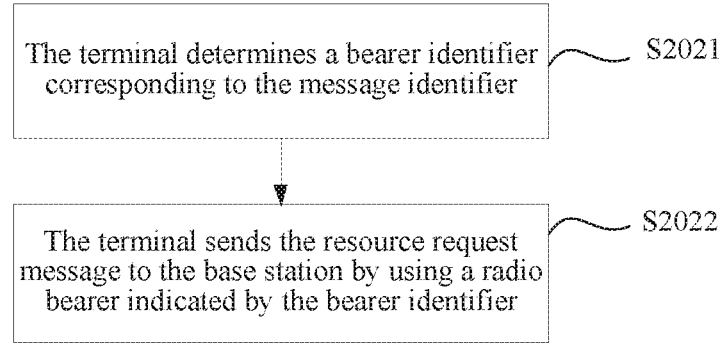
FIG. 5 is a schematic flowchart of step S202 in FIG. 4.

When the correspondence between each message identifier and the bearer identifier is pre-established, as shown in FIG. 5, step S202 in the embodiment shown in FIG. 4 may include the following steps.

S2021: The terminal determines, based on a correspondence between a message identifier of a V2X message supported by the terminal and a bearer identifier of a radio bearer for communication between the terminal and the base station, a bearer identifier corresponding to the message identifier.

In this embodiment of the present application, the correspondence between the message identifier and the bearer identifier may be obtained by the terminal by requesting the correspondence from the network device, or the correspondence may be sent by the network device to the base station after the terminal in an idle moment sends a QoS request message to the network device.

S2022: The terminal sends the resource request message to the base station by using a radio bearer identified by the bearer identifier.

S203: The terminal receives a resource identifier sent by the base station.

It can be learned by referring to the foregoing descriptions in the embodiment shown in FIG. 4 that the base station may pre-obtain QoS information of different terminals that is sent by the network device and allocate corresponding radio resources to different QoS parameters. The base station may store correspondences between the QoS parameters and the radio resources in a form of a resource pool. Correspondingly, when receiving the resource request message sent by the terminal, the base station may search the resource pool for the resource identifier of the radio resource corresponding to the message identifier.

S204: The terminal sends the to-be-sent V2X message by using a radio resource identified by the resource identifier.

In this embodiment of the present application, before sending the to-be-sent V2X message, the terminal may directly send the message identifier of the to-be-sent V2X message to the base station without obtaining, through communication with the network device, the QoS information delivered by the network device. The base station searches for and returns the radio resource of the to-be-sent V2X message for the terminal based on the QoS information.

Compared with the embodiments shown in FIG. 2 and FIG. 3, in the method, the terminal may accurately find, only through communication with the base station, the radio resource matching the to-be-sent V2X message, thereby satisfying a communication quality requirement of the to-be-sent V2X message.

Figure 6:
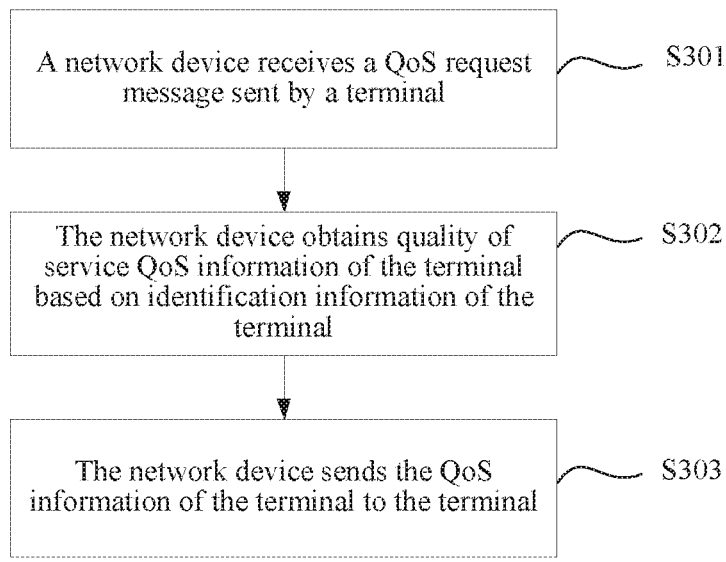
FIG. 6 is a schematic flowchart of still another V2X communication method according to an embodiment of the present application.

An embodiment of the present application further provides a V2X communication method. The method may be applied to the network device 4 shown in FIG. 1. As shown in FIG. 6, the method may include the following steps.

S301: The network device receives a QoS request message sent by a terminal.

The QoS request message carries identification information of the terminal.

S302: The network device obtains quality of service QoS information of the terminal based on identification information of the terminal.

The QoS information includes a message identifier of a V2X message supported by the terminal and a QoS parameter corresponding to the message identifier. For detailed descriptions of the message identifier and the QoS parameter, refer to the descriptions in step S102 in the embodiment shown in FIG. 2, and details are not described herein again.

In this embodiment of the present application, the QoS information of the terminal is usually used as a part of subscription information and is stored in an HSS. Therefore, when obtaining the QoS information, the network device needs to obtain the QoS information from the HSS. If the network device is an MME, S302 in FIG. 6 may include the following steps.

S3021: The MME sends a first request message to the home subscriber server HSS.

The first request message carries the identification information of the terminal.

S3022: The MME receives the QoS information sent by the HSS based on the identification information of the terminal.

In another embodiment of the present application, the MME may alternatively send the first request message to a V2X service function entity, and receive the QoS information found and sent by the V2X service function entity.

In addition, if the network device is a V2X service function entity, the V2X service function entity may further store the QoS information. Therefore, step S302 in the method may include the following steps.

S3024: If the V2X service function entity locally stores the QoS information of the terminal, the V2X service function entity obtains the QoS information of the terminal by searching for the locally stored QoS information of the terminal.

S3025: If the V2X service function entity does not locally store the QoS information of the terminal, the V2X service function entity sends a first request message to the HSS, where the first request message carries the identification information of the terminal; and the V2X service function entity receives the QoS information sent by the HSS based on the identification information of the terminal.

There are a plurality of obtaining manners related to S302. In any one of the manners, the network device may obtain the QoS information of the terminal.

S303: The network device sends the QoS information of the terminal to the terminal.

Because QoS information of a V2X message in a V2X service of each terminal may be obtained from the network device, a communication quality parameter of the terminal does not need to be preset in the terminal, that is, the terminal may obtain customized QoS information of the V2X message from a network, so that when sending a V2X message in the V2X service, the terminal can find matching QoS information, thereby satisfying a communication quality requirement of the terminal for implementing the V2X service.

In addition, in another embodiment of the present application, when sending the QoS information to the terminal, the network device may further send a correspondence between a message identifier and a bearer identifier to the terminal. If the network device is an MME, the network device allocates a radio bearer to the message identifier of the V2X message supported by the terminal in one or more radio bearers for communication between the terminal and the base station, creates a correspondence between the message identifier of the V2X message and a bearer identifier of the allocated radio bearer, and the network device sends the correspondence to the terminal. If the network device is a V2X service function entity, the network device sends a correspondence between the message identifier of the V2X message supported by the terminal and a bearer identifier of a radio bearer for communication between the terminal and the base station to the terminal. In this embodiment of the present application, if the network device is a V2X service function entity, the correspondence between the message identifier of the V2X message supported by the terminal and the bearer identifier of the radio bearer may be preset by a user. Alternatively, an MME allocates the correspondence to the V2X service function entity, and the V2X service function entity stores the correspondence.

Figure 7:
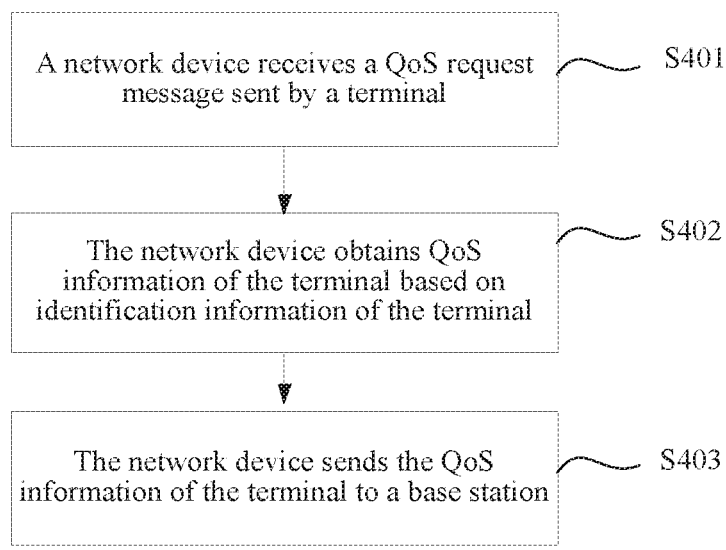
FIG. 7 is a schematic flowchart of still another V2X communication method according to an embodiment of the present application.

In the embodiment shown in FIG. 3, during radio resource determining, the terminal does not locally determine the radio resource, but the terminal communicates with the base station, and the base station determines the radio resource. Therefore, in this embodiment of the present application, another V2X communication method is further provided. The method may be applied to the network device 4 shown in FIG. 1. As shown in FIG. 7, the method may include the following steps.

S401: The network device receives a QoS request message sent by a terminal.

The QoS request message carries identification information of the terminal.

S402: The network device obtains QoS information of the terminal based on the identification information of the terminal.

The QoS information includes a message identifier of a V2X message supported by the terminal and a QoS parameter corresponding to the message identifier.

S403: The network device sends the QoS information of the terminal to a base station.

The base station may receive the QoS information sent by the network device. Therefore, the base station may pre-allocate corresponding radio resources to different QoS parameters, and the base station may store correspondences between the QoS parameters and the radio resources in a form of a resource pool. Once receiving a resource request message that carries the message identifier and that is sent by the terminal, the base station may search for a corresponding radio resource based on the message identifier, and use the corresponding radio resource as a radio resource for sending a to-be-sent V2X message.

Referring to the embodiment shown in FIG. 5, when the terminal sends the resource request message to the base station, the resource request message may not carry the message identifier. Instead, the terminal sends the resource request message by using a radio bearer corresponding to the message identifier, so that the base station determines, for the terminal based on a resource identifier of the radio resource for sending the resource request message, the radio resource for sending the to-be-sent V2X message.

In this way, when the network device is the V2X service function entity, based on the embodiment shown in FIG. 7, the method may include:

sending, by the network device, a correspondence between the message identifier of the V2X message supported by the terminal and a bearer identifier of a radio bearer for communication between the terminal and the base station to the base station. The correspondence may be preset by a user. Alternatively, an MME sends the correspondence to the V2X service function entity, and the V2X service function entity stores the correspondence.

In addition, when the network device is the MME, based on the embodiment shown in FIG. 7, the method may include:

allocating, by the MME, a radio bearer to the message identifier of the V2X message supported by the terminal in one or more radio bearers for communication between the terminal and the base station, creating a correspondence between the message identifier of the V2X message and a bearer identifier of the allocated bearer, and sending the correspondence to the base station.

In any one of the manners, the network device finally sends the correspondence between the message identifier and the bearer identifier to the base station, so that the base station may use the correspondence between the message identifier and the bearer identifier.

Figure 8:
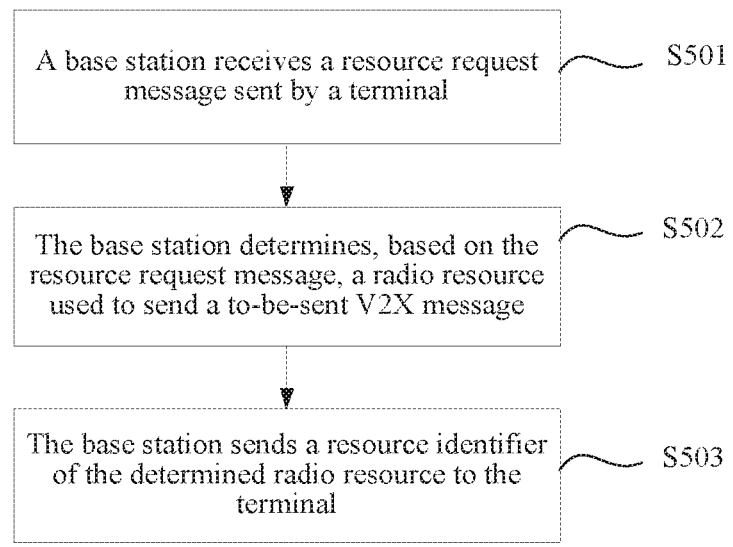
FIG. 8 is a schematic flowchart of still another V2X communication method according to an embodiment of the present application.

In the foregoing embodiments shown in FIG. 2 to FIG. 4, the V2X communication method provided in the present application is described by using the terminal as an execution body. In the embodiments shown in FIG. 5 to FIG. 7, the V2X communication method provided in the present application is described by using the network device as an execution body. As shown in FIG. 8, in this embodiment of the present application, a V2X communication method is further provided. The method may be applied to the base station in FIG. 1, and the method may include the following steps.

S501: The base station receives a resource request message sent by a terminal.

The resource request message is used to request a radio resource for sending a to-be-sent V2X message of the terminal.

S502: The base station determines, based on the resource request message, a radio resource used to send a to-be-sent V2X message.

In an embodiment of the present application, when the base station stores QoS information of the terminal, the QoS information includes a message identifier and a QoS parameter corresponding to the message identifier, and the resource request message carries a message identifier of the to-be-sent V2X message. Step S502 may include the following steps.

S5021: The base station obtains, based on a correspondence between a message identifier of the to-be-sent V2X message and a QoS parameter, the QoS parameter corresponding to the message identifier of the to-be-sent V2X message.

S5022: The base station obtains, based on a correspondence between the QoS parameter and a radio resource, the radio resource corresponding to the obtained QoS parameter, and determines the obtained radio resource as the radio resource used to send the to-be-sent V2X message.

In an embodiment of the present application, when the base station stores a correspondence between a bearer identifier and a QoS parameter, step S502 may include the following steps.

S5026: The base station obtains, based on the correspondence between the QoS parameter and the bearer identifier of a radio bearer for communication between the terminal and the base station, a QoS parameter corresponding to a determined bearer identifier.

S5027: The base station obtains, based on a correspondence between a QoS parameter and a radio resource, a radio resource corresponding to the obtained QoS parameter, and determines the obtained radio resource as the radio resource used to send the to-be-sent V2X message.

S503: The base station sends a resource identifier of the determined radio resource to the terminal.

Because QoS information of a V2X message in a V2X service of each terminal may be obtained from the network device, a communication quality parameter of the terminal does not need to be preset in the terminal, that is, the terminal may obtain customized QoS information of the V2X message from a network, so that when sending a V2X message in the V2X service, the terminal can find matching QoS information, thereby satisfying a communication quality requirement of the terminal for implementing the V2X service.

Figure 9:
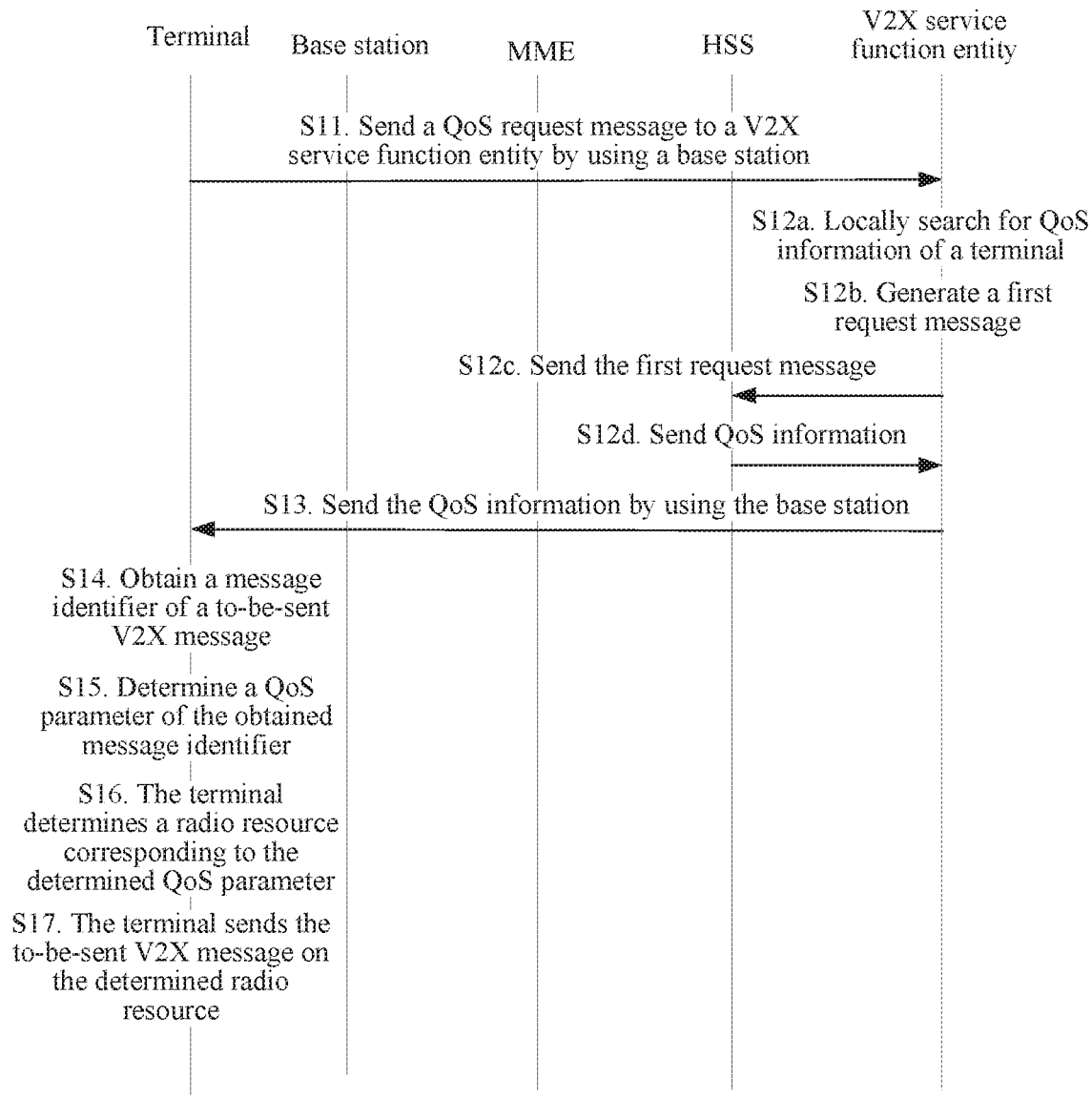
FIG. 9 is a signaling flowchart according to an embodiment of the present application.

Implementation 1:

In this embodiment of the present application, an example in which the network device is a V2X function entity is used. As shown in FIG. 9, the figure includes a base station, an MME, an HSS, and a V2X service function entity.

Using an example in which the message identifier in the QoS information is a message type, as shown in FIG. 9, the method provided in this embodiment of the present application may include the following steps.

S11: The terminal sends a QoS request message to the V2X service function entity by using the base station, where the QoS request message may be a Subscription message.

S12a: The V2X service function entity locally searches for QoS information of the terminal. Alternatively, S12b: the V2X service function entity generates a first request message; S12c: the V2X service function entity sends the first request message to the HSS; and S12d: the HSS sends QoS information of the terminal to the V2X service function entity.

The first request message carries identification information. The HSS searches for the QoS information of the terminal based on the identification information.

S13: The V2X service function entity sends the QoS information to the terminal by using the base station.

S14: The terminal obtains a message identifier of a to-be-sent V2X message.

S15: The terminal determines a QoS parameter corresponding to the message identifier.

S16: The terminal determines a radio resource corresponding to the determined QoS parameter.

S17: The terminal sends the to-be-sent V2X message on the determined radio resource.

Figure 10:
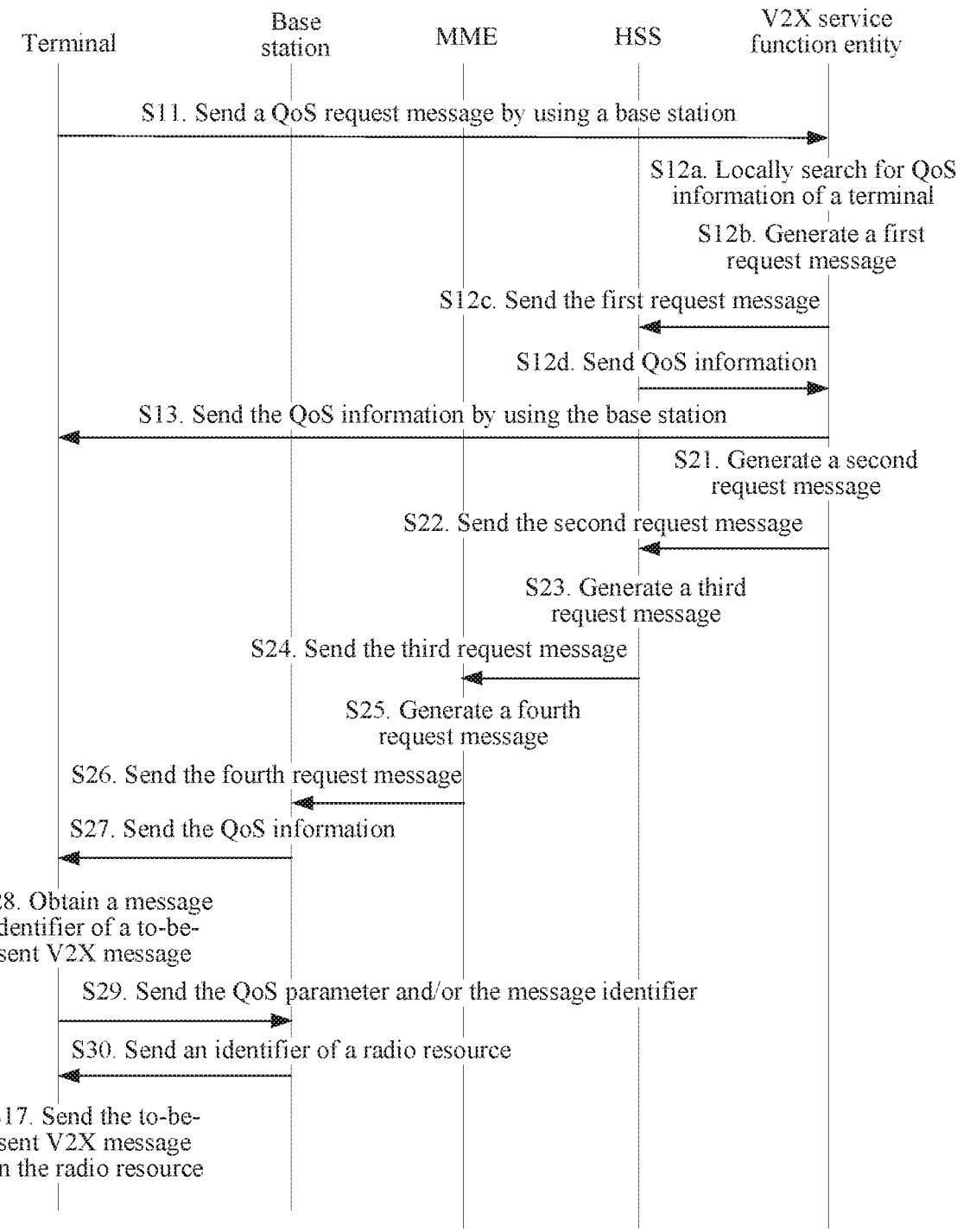
FIG. 10 is another signaling flowchart according to an embodiment of the present application.

In another V2X communication method provided in an embodiment of the present application, an example in which the message identifier in the QoS information is a message type is still used. Based on the embodiment shown in FIG. 9, as shown in FIG. 10, the method may include the following steps.

S21: The V2X service function entity generates a second request message, where the second request message may be a Notification message, and the second request message carries the identification information and the QoS information.

S22: The V2X service function entity sends the second request message to the HSS.

S23: The HSS generates a third request message, where the third request message may be an insert subscriber data message, and the third request message carries the identification information and the QoS information.

S24: The HSS sends the third request message to the MME.

S25: The MME generates a fourth request message, where the fourth request message may be a UE context modification message, and the fourth request message carries the identification information and the QoS information.

S26: The MME sends the fourth request message to the base station.

S27: The base station sends the QoS information to the terminal.

S28: The terminal obtains a message identifier of a to-be-sent V2X message.

S29: The terminal sends the message identifier and/or a QoS parameter to the base station.

In this step, the terminal may generate a resource request message, and add the message identifier and/or the QoS parameter to the resource request message.

S30: The base station sends an identifier of a radio resource.

The radio resource is a radio resource used to send the to-be-sent V2X message.

S31: The terminal sends the to-be-sent V2X message on the radio resource.

In this embodiment of the present application, step S13 may be omitted, that is, the network device sends the QoS information to only the base station.

Figure 11:
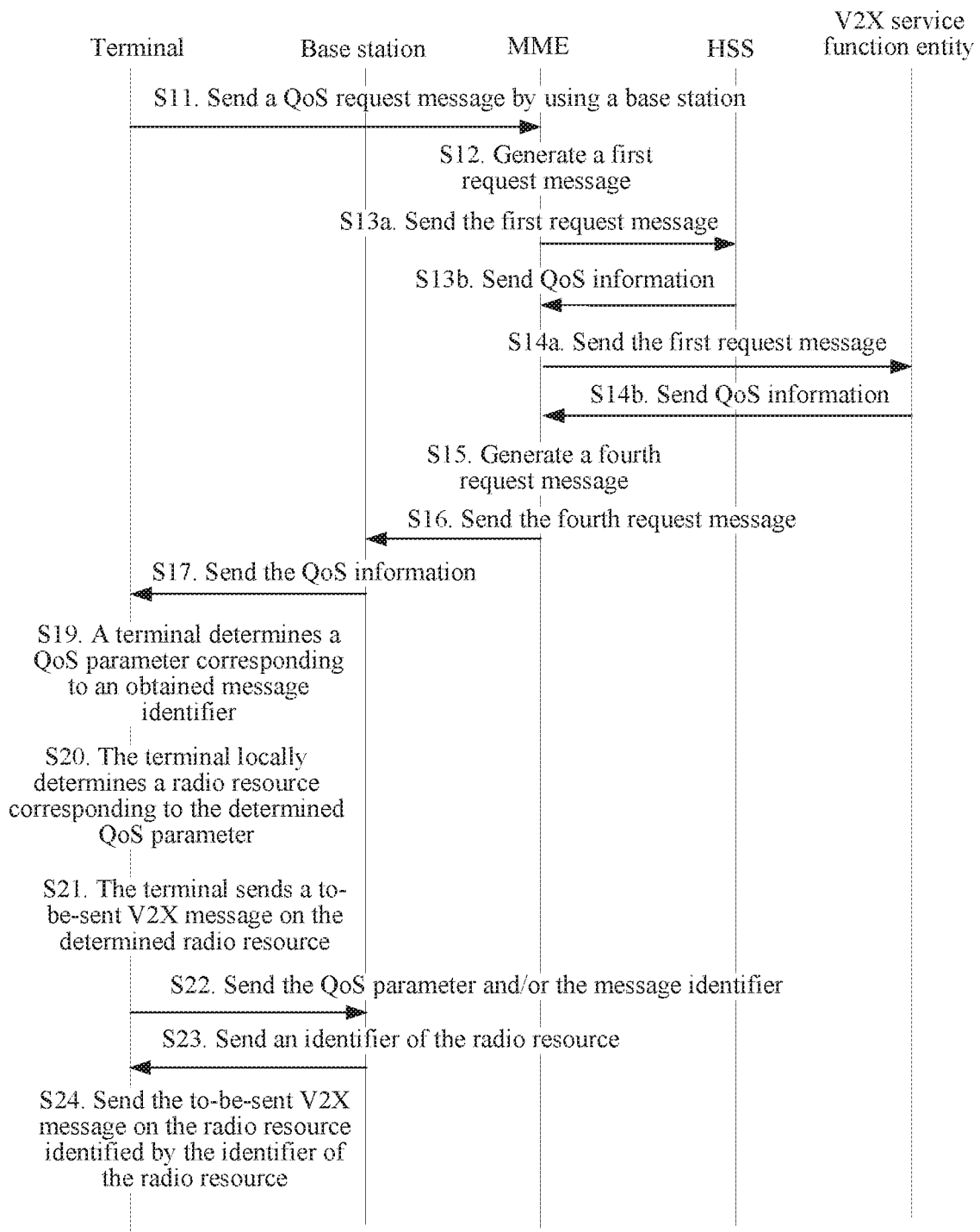
FIG. 11 is still another signaling flowchart according to an embodiment of the present application.

Using an example in which the message identifier in the QoS information is a message type, an embodiment of the present application provides another V2X communication method. As shown in FIG. 11, the method may include the following steps.

S11: The terminal sends a QoS request message to the MME by using the base station, where the QoS request message may be an NAS message, for example, an Attach Request (attach request).

S12: The MME generates a first request message.

S13a: The MME sends the first request message to the HSS; and S14a: the HSS sends QoS information of the terminal to the MME.

Alternatively, S13b: the MME sends the first request message to the V2X service function entity; and S14b: the V2X service function entity sends QoS information of the terminal to the MME.

The first request message carries the identification information. The HSS searches for the QoS information of the terminal based on the identification information.

S15: The MME generates a fourth request message, where the fourth request message may be a UE context modification message, and the fourth request message carries the identification information and the QoS information.

S16: The MME sends the fourth request message to the base station.

S17: The base station sends the QoS information to the terminal.

S18: The terminal obtains a message identifier of a to-be-sent V2X message.

S19: The terminal determines a QoS parameter corresponding to the obtained message identifier.

S20: The terminal locally determines a radio resource corresponding to the determined QoS parameter.

S21: The terminal sends the to-be-sent V2X message on the determined radio resource.

In another embodiment, the method further includes the following steps.

S22: The terminal sends a resource request message carrying the message identifier and/or the QoS parameter to the base station.

S23: The base station sends an identifier of the radio resource.

S24: The terminal sends the to-be-sent V2X message on the radio resource identified by the identifier of the radio resource.

Figure 12:
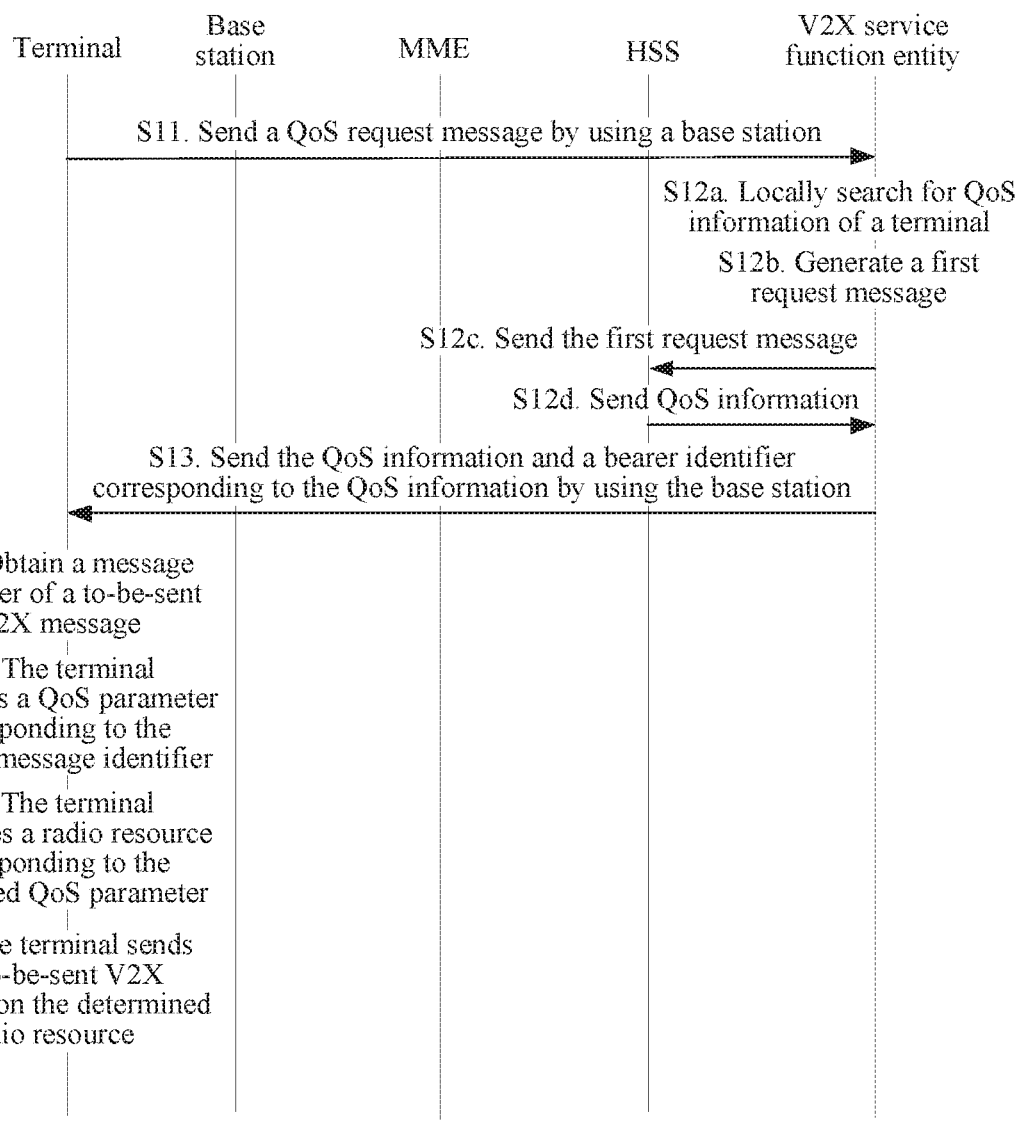
FIG. 12 is still another signaling flowchart according to an embodiment of the present application.

Using an example in which the message identifier in the QoS information is a message type, as shown in FIG. 12, the method provided in this embodiment of the present application may include the following steps.

S11: The terminal sends a QoS request message to the V2X service function entity, where the QoS request message may be a Subscription message.

S12a: The V2X service function entity locally searches for QoS information of the terminal. Alternatively, S12b: the V2X service function entity generates a first request message; S12c: the V2X service function entity sends the first request message to the HSS; and S12d: the HSS sends QoS information of the terminal to the V2X service function entity.

The first request message carries the identification information. The HSS searches for the QoS information of the terminal based on the identification information.

S13: The V2X service function entity sends the QoS information and a bearer identifier corresponding to the QoS information to the terminal by using the base station.

The V2X service function entity may locally search for the bearer identifier corresponding to the QoS information.

The QoS information includes a message flow template type and a QoS parameter, and the message flow template type, the QoS parameter, and the bearer identifier correspond to each other.

S14: The terminal obtains a message identifier of a to-be-sent V2X message.

S15: The terminal determines a QoS parameter corresponding to the obtained message identifier.

S16: The terminal determines a radio resource corresponding to the determined QoS parameter.

S17: The terminal sends the to-be-sent V2X message on the determined radio resource.

Figure 13:
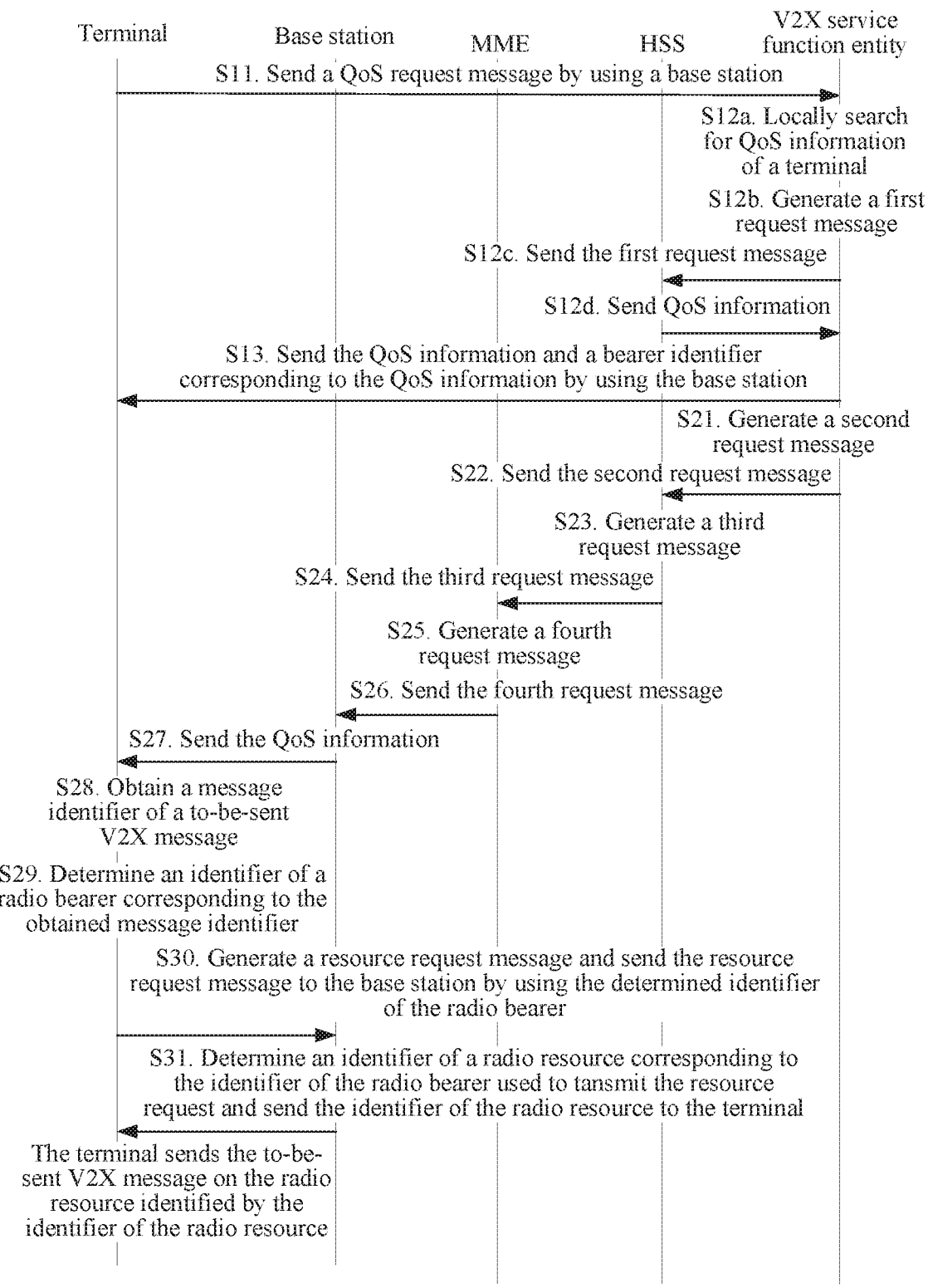
FIG. 13 is still another signaling flowchart according to an embodiment of the present application.

In another V2X communication method provided in an embodiment of the present application, an example in which the message identifier in the QoS information is a message type is still used. As shown in FIG. 13, based on the embodiment shown in FIG. 12, the method may include the following steps.

S21: The V2X service function entity generates a second request message, where the second request message may be a Notification message, and the second request message carries the bearer identifier and the QoS information.

S22: The V2X service function entity sends the second request message to the HSS.

S23: The HSS generates a third request message, where the third request message may be an insert subscriber data message, and the third request message carries the bearer identifier and the QoS information.

S24: The HSS sends the third request message to the MME.

S25: The MME generates a fourth request message, where the fourth request message may be a UE context modification message, and the fourth request message carries the bearer identifier and the QoS information.

S26: The MME sends the fourth request message to the base station.

S27: The base station sends the QoS information to the terminal.

S28: The terminal obtains a message identifier of a to-be-sent V2X message.

S29: The terminal determines an identifier of a radio bearer corresponding to the obtained message identifier.

S30: The terminal generates a resource request message and sends the resource request message to the base station by using the determined identifier of the radio bearer.

S30: The base station determines an identifier of a radio resource corresponding to the identifier of the radio bearer used to transmit the resource request message and sends the identifier of the radio resource to the terminal.

S31: The terminal sends the to-be-sent V2X message on the radio resource identified by the identifier of the radio resource.

Figure 14:
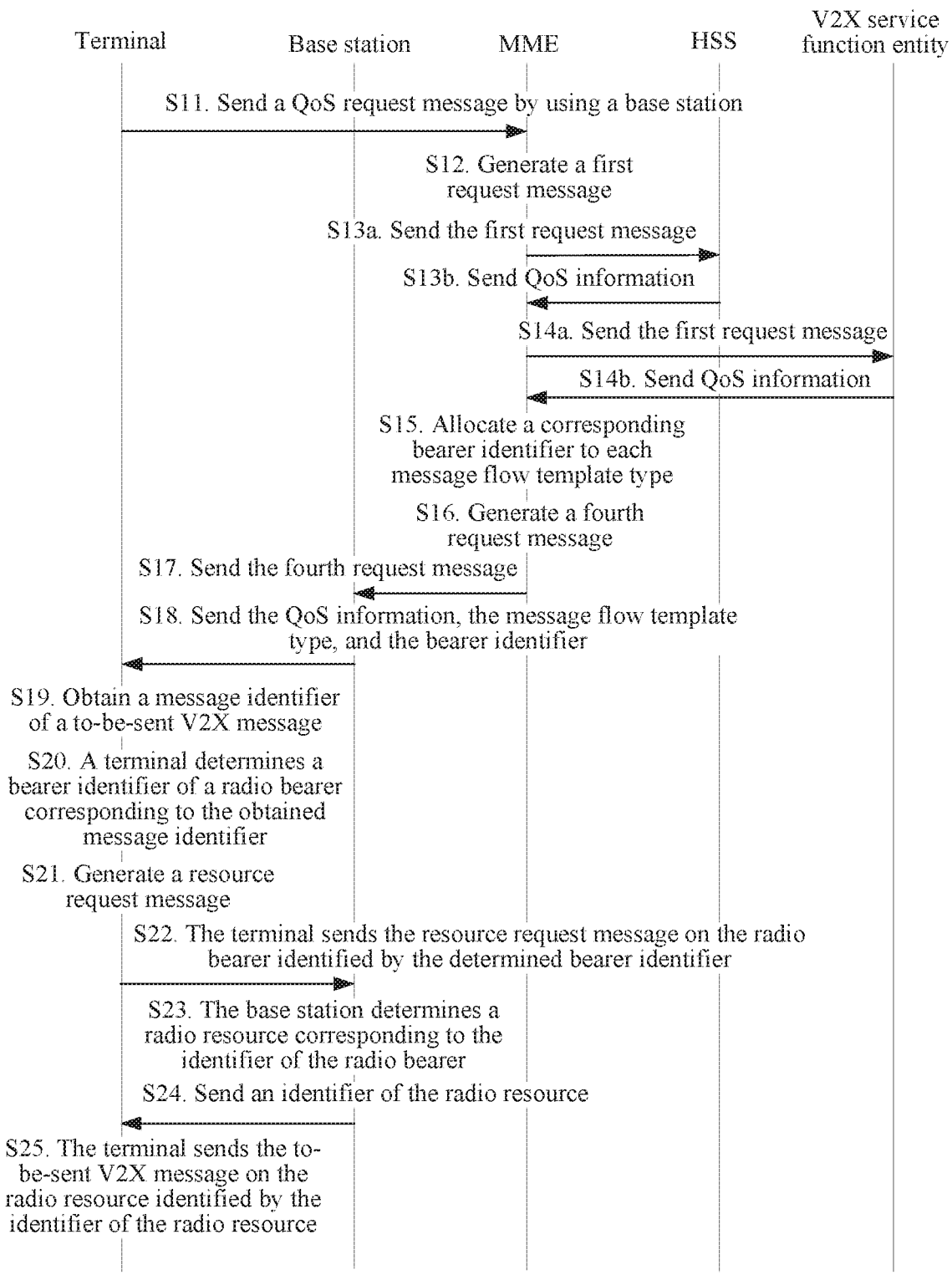
FIG. 14 is still another signaling flowchart according to an embodiment of the present application.

Using an example in which the message identifier in the QoS information is a message flow template type, an embodiment of the present application provides another V2X communication method. As shown in FIG. 14, the method may include the following steps.

S11: The terminal sends a QoS request message to the MME by using the base station, where the QoS request message may be an NAS message, for example, an Attach Request (attach request).

S12: The MME generates a first request message.

S13a: The MME sends the first request message to the HSS; and S14a: the HSS sends QoS information of the terminal to the MME.

Alternatively, S13b: the MME sends the first request message to the V2X service function entity; and S14b: the V2X service function entity sends QoS information of the terminal to the MME.

The QoS information includes a message flow template type and QoS parameter. The first request message carries the identification information. The HSS searches for the QoS information of the terminal based on the identification information.

S15: The MME allocates a corresponding bearer identifier to each message flow template type.

S16: The MME generates a fourth request message, where the fourth request message may be a UE context modification message, the fourth request message carries the bearer identifier and the QoS information, and the bearer identifier corresponds to the QoS information.

S17: The MME sends the fourth request message to the base station.

S18: The base station sends the QoS information, the message flow template type, and the bearer identifier to the terminal, where the QoS information, the message flow template type, and the bearer identifier correspond to each other.

S19: The terminal obtains a message identifier of a to-be-sent V2X message.

S20: The terminal determines a bearer identifier of a radio bearer corresponding to the obtained message identifier.

S21: The terminal generates a resource request message.

S22: The terminal sends the resource request message to the base station on the radio bearer identified by the determined bearer identifier.

S23: The base station determines a radio resource corresponding to the identifier of the radio bearer.

S24: The base station sends an identifier of the radio resource to the terminal.

S25: The terminal sends the to-be-sent V2X message on the radio resource identified by the identifier of the radio resource.

Figure 15:
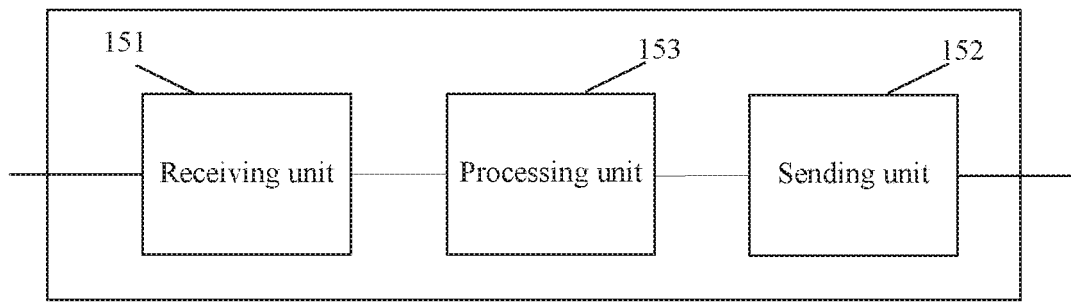
FIG. 15 is a schematic structural diagram of a V2X message communication apparatus according to an embodiment of the present application.

An embodiment of the present application further provides a V2X message communication apparatus. FIG. 15 is a schematic structural diagram of a V2X message communication apparatus according to an embodiment of the present application. The apparatus may be applied to a terminal. The terminal may be an in-vehicle terminal, an in-vehicle navigation device, or the like. As shown in FIG. 15, the apparatus may include a sending unit 151, a receiving unit 152, and a processing unit 153.

The sending unit 151 is configured to send a quality of service QoS request message to a network device, and the QoS request message carries identification information of the terminal.

The receiving unit 152 is configured to receive QoS information of the terminal that is sent by the network device based on the identification information of the terminal, and the QoS information includes a message identifier of a V2X message supported by the terminal and a QoS parameter corresponding to the message identifier.

The processing unit 153 is configured to: obtain, based on the QoS information received by the receiving unit, a QoS parameter corresponding to a message identifier of a to-be-sent V2X message; and obtain, based on the obtained QoS parameter, a radio resource used to send the to-be-sent V2X message.

The sending unit 151 is further configured to send the to-be-sent V2X message by using the radio resource obtained by the processing unit.

In this embodiment of the present application, the message identifier includes at least one of a message type or a message flow template type. The QoS parameter includes at least one of a priority, a latency, reliability, or a bit rate. The network device is a V2X service function entity or a mobility management entity MME.

In another embodiment of the present application, when obtaining, based on the QoS parameter received by the receiving unit, the radio resource used to send the to-be-sent V2X message, the processing unit 153 is specifically configured to:

obtain, based on a correspondence between a resource identifier and a QoS parameter, a resource identifier corresponding to the obtained QoS parameter, where the resource identifier in the correspondence is used to identify a pre-allocated radio resource; and determine a radio resource identified by the obtained resource identifier as the radio resource used to send the to-be-sent V2X message.

In another embodiment of the present application, the processing unit 153 is further configured to send a resource request message to a base station, the resource request message carries the obtained QoS parameter, the resource request message is used to request a resource identifier from the base station, and the resource identifier is a resource identifier of the radio resource used to send the to-be-sent V2X message. The receiving unit 152 is further configured to receive the resource identifier sent by the base station. The processing unit 153 is further configured to determine a radio resource identified by the resource identifier received by the receiving unit as the radio resource used to send the to-be-sent V2X message.

It should be noted that the apparatus shown in FIG. 15 ay be configured to perform the method shown in FIG. 2 or FIG. 3. For details, refer to related descriptions in the method embodiments, and details are not described herein again. In addition, the apparatus shown in FIG. 15 may further be configured to perform the operation steps of the terminal in the embodiment shown in FIG. 9. For details, refer to related descriptions in the embodiment shown in FIG. 9, and details are not described herein again.

Figure 16:
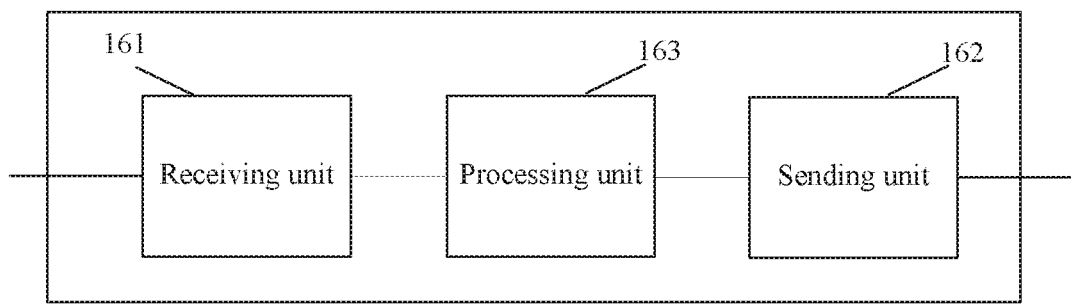
FIG. 16 is a schematic structural diagram of another V2X message communication apparatus according to an embodiment of the present application.

An embodiment of the present application further provides a V2X message communication apparatus. FIG. 16 is a schematic structural diagram of a V2X message communication apparatus according to an embodiment of the present application. The apparatus may be applied to a terminal. The terminal may be an in-vehicle terminal, an in-vehicle navigation device, or the like. As shown in FIG. 16, the apparatus may include a sending unit 161, a receiving unit 162, and a processing unit 163.

The processing unit 163 is configured to obtain a message identifier of a to-be-sent V2X message.

The sending unit 161 is configured to send a resource request message to a base station based on the message identifier obtained by the processing unit, the resource request message is used to request a resource identifier from the base station, and the resource identifier is a resource identifier of a radio resource used to send the to-be-sent V2X message.

The receiving unit 162 is configured to receive the resource identifier sent by the base station.

The sending unit 161 is further configured to send the to-be-sent V2X message by using the radio resource identified by the resource identifier received by the receiving unit.

In this embodiment of the present application, the resource request message carries the message identifier of the to-be-sent V2X message. The network device is a V2X service function entity or a mobility management entity MME.

In another embodiment of the present application, when sending the resource request message to the base station based on the obtained message identifier, the sending unit 161 is specifically configured to:

determine, based on a correspondence between a message identifier of a V2X message supported by the terminal and a bearer identifier of a radio bearer for communication between the terminal and the base station, a bearer identifier corresponding to the obtained message identifier; and send the resource request message to the base station by using a radio bearer identified by the determined bearer identifier.

It should be noted that the apparatus shown in FIG. 16 may be configured to perform the method shown in FIG. 4 or FIG. 5. For details, refer to related descriptions in the method embodiments, and details are not described herein again. In addition, the apparatus shown in FIG. 16 may further be configured to perform the operation steps of the terminal in any embodiment in FIG. 10, FIG. 11, FIG. 13, and FIG. 14. For details, refer to related descriptions in any embodiment in FIG. 10, FIG. 11, FIG. 13, and FIG. 14, and details are not described herein again.

Figure 17:
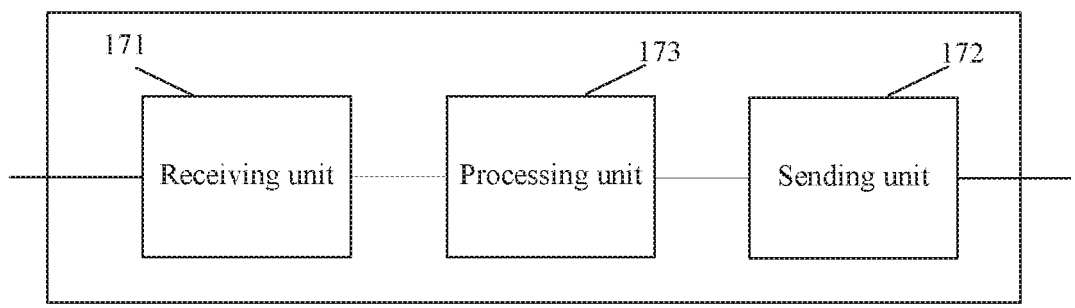
FIG. 17 is a schematic structural diagram of still another V2X message communication apparatus according to an embodiment of the present application.

An embodiment of the present application further provides a V2X message communication apparatus. FIG. 17 is a schematic structural diagram of a V2X message communication apparatus according to an embodiment of the present application. The apparatus may be applied to a network device, and the network device may be an MME, a V2X service function entity, or the like. The apparatus may be configured to perform the method shown in FIG. 6. As shown in FIG. 17, the apparatus may include a sending unit 171, a receiving unit 172, and a processing unit 173.

The receiving unit 172 is configured to receive a quality of service QoS request message sent by a terminal, and the QoS request message carries identification information of the terminal.

The processing unit 173 is configured to obtain quality of service QoS information of the terminal based on the identification information of the terminal that is carried in the QoS request message received by the receiving unit, and the QoS information includes a message identifier of a V2X message supported by the terminal and a QoS parameter corresponding to the message identifier.

The sending unit 171 is configured to send the QoS information of the terminal to the terminal.

In this embodiment of the present application, the message identifier includes at least one of a message type or a message flow template type. The QoS parameter includes at least one of a priority, a latency, reliability, or a bit rate. The network device is a V2X service function entity or a mobility management entity MME.

In another embodiment of the present application, if the network device is a V2X service function entity, the sending unit 171 is further configured to send a correspondence between the message identifier of the V2X message supported by the terminal and a bearer identifier of a radio bearer for communication between the terminal and the base station to the terminal.

In another embodiment of the present application, if the network device is an MME, the processing unit 173 is further configured to: allocate a radio bearer to the message identifier of the V2X message supported by the terminal in one or more radio bearers for communication between the terminal and the base station, and create a correspondence between the message identifier of the V2X message and a bearer identifier of the allocated radio bearer; and the sending unit 171 is further configured to send the correspondence to the terminal.

In another embodiment of the present application, the sending unit 171 is further configured to send a first request message to a home subscriber server HSS, and the first request message carries the identification information of the terminal. The receiving unit 172 is further configured to receive the QoS information sent by the HSS based on the identification information of the terminal.

In another embodiment of the present application, if the network device is a V2X service function entity, when the V2X service function entity locally stores the QoS information of the terminal, the processing unit 173 is further configured to obtain the QoS information of the terminal by searching for the locally stored QoS information of the terminal.

When the V2X service function entity does not locally store the QoS information of the terminal, the sending unit 171 is further configured to send a first request message to an HSS, and the first request message carries the identification information of the terminal; and the receiving unit 173 is further configured to receive the QoS information sent by the HSS based on the identification information of the terminal.

It should be noted that the apparatus shown in FIG. 17 may be configured to perform the operation steps of the V2X service function entity or the MME in the embodiments shown in FIG. 9 to FIG. 14. For details, refer to related descriptions in any embodiment in FIG. 9 to FIG. 14, and details are not described herein again.

Figure 18:
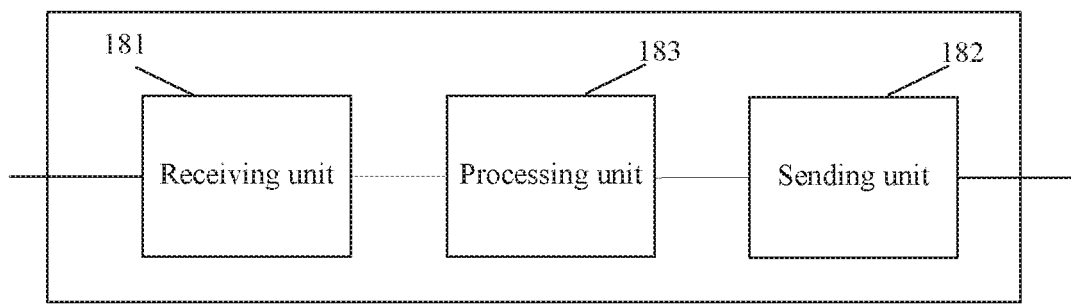
FIG. 18 is a schematic structural diagram of still another V2X message communication apparatus according to an embodiment of the present application.

An embodiment of the present application further provides a V2X message communication apparatus. FIG. 18 is a schematic structural diagram of a V2X message communication apparatus according to an embodiment of the present application. The apparatus may be applied to a network device, and the network device may be an MME, a V2X service function entity, or the like. The apparatus may be configured to perform the method shown in FIG. 7. As shown in FIG. 18, the apparatus may include a sending unit 181, a receiving unit 182, and a processing unit 183.

The receiving unit 182 is configured to receive a quality of service QoS request message sent by a terminal, and the QoS request message carries identification information of the terminal.

The processing unit 183 is configured to obtain QoS information of the terminal based on the identification information of the terminal that is carried in the QoS request message received by the receiving unit.

The sending unit 181 is configured to send the QoS information of the terminal that is obtained by the processing unit to a base station, and the QoS information includes a message identifier of a V2X message supported by the terminal and a QoS parameter corresponding to the message identifier.

In this embodiment of the present application, the message identifier includes at least one of a message type or a message flow template type.

The QoS parameter includes at least one of a priority, a latency, reliability, or a bit rate. The network device is a V2X service function entity or a mobility management entity MME.

In another embodiment of the present application, if the network device is a V2X service function entity, the sending unit 181 is further configured to send a correspondence between the message identifier of the V2X message supported by the terminal and a bearer identifier of a radio bearer for communication between the terminal and the base station to the base station.

In another embodiment of the present application, if the network device is an MME, the processing unit 183 is further configured to: allocate a radio bearer to the message identifier of the V2X message supported by the terminal in one or more radio bearers for communication between the terminal and the base station, and create a correspondence between the message identifier of the V2X message and a bearer identifier of the allocated bearer; and the sending unit 181 is further configured to send the correspondence to the base station.

It should be noted that the apparatus shown in FIG. 18 may further be configured to perform the operation steps of the MME or the V2X service function entity in any embodiment in FIG. 10, FIG. 11, FIG. 13, and FIG. 14. For details, refer to related descriptions in any embodiment in FIG. 10, FIG. 11, FIG. 13, and FIG. 14, and details are not described herein again.

Figure 19:
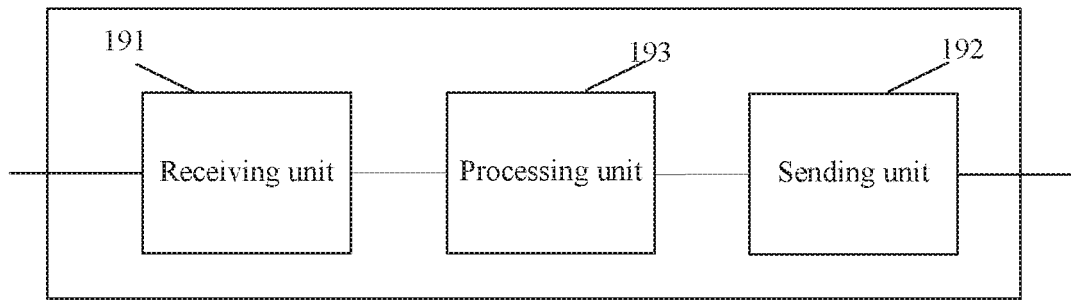
FIG. 19 is a schematic structural diagram of still another V2X message communication apparatus according to an embodiment of the present application.

An embodiment of the present application further provides a V2X message communication apparatus. FIG. 19 is a schematic structural diagram of a V2X message communication apparatus according to an embodiment of the present application. The apparatus may be applied to a base station. The apparatus may be configured to perform the method shown in FIG. 8. As shown in FIG. 19, the apparatus may include a sending unit 191, a receiving unit 192, and a processing unit 193.

The receiving unit 192 is configured to receive a resource request message sent by a terminal, and the resource request message is used to request a radio resource for sending a to-be-sent V2X message of the terminal.

The processing unit 193 is configured to determine, based on the resource request message received by the receiving unit, the radio resource used to send the to-be-sent V2X message.

The sending unit 191 is configured to send a resource identifier of the radio resource determined by the processing unit to the terminal.

In another embodiment of the present application, the resource request message carries a message identifier of the to-be-sent V2X message; and when determining, based on the resource request message received by the receiving unit, the radio resource used to send the to-be-sent V2X message, the processing unit 193 is specifically configured to:

obtain, based on a correspondence between the message identifier of the to-be-sent V2X message and a QoS parameter, the QoS parameter corresponding to the message identifier of the to-be-sent V2X message; obtain, based on a correspondence between a QoS parameter and a radio resource, a radio resource corresponding to the obtained QoS parameter; and determine the obtained radio resource as the radio resource used to send the to-be-sent V2X message.

In another embodiment of the present application, the base station stores a correspondence between a bearer identifier and a QoS parameter; and when determining, based on the resource request message received by the receiving unit, the radio resource used to send the to-be-sent V2X message, the processing unit 193 is specifically configured to:

determine a bearer identifier of a radio bearer used to transmit the resource request message; obtain, based on the correspondence between the QoS parameter and the bearer identifier of a radio bearer for communication between the terminal and the base station, a QoS parameter corresponding to the determined bearer identifier; obtain, based on a correspondence between a QoS parameter and a radio resource, a radio resource corresponding to the obtained QoS parameter; and determine the obtained radio resource as the radio resource used to send the to-be-sent V2X message.

It should be noted that the apparatus shown in FIG. 19 may further be configured to perform the operation steps of the base station in any embodiment in FIG. 10, FIG. 11, FIG. 13, and FIG. 14. For details, refer to related descriptions in any embodiment in FIG. 10, FIG. 11, FIG. 13, and FIG. 14, and details are not described herein again.

Figure 20:
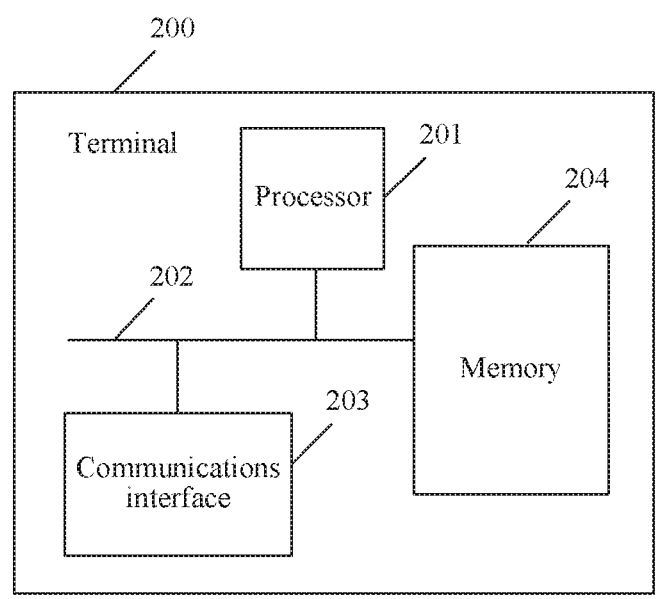
FIG. 20 is a schematic structural diagram of a terminal according to an embodiment of the present application.

An embodiment of the present application further provides a terminal. As shown in FIG. 20, the terminal 200 may include at least one processor 201, at least one communications bus 202, at least one communications interface 203, and at least one memory 204.

The communications bus 202 is configured to implement connection and communication between these components. The sending unit and the receiving unit in FIG. 15 and FIG. 16 may be integrated into the communications interface 203 in FIG. 20. The memory 204 may include a read-only memory and a random access memory, and provide an instruction and data to the processor 201. A part of the memory 204 may further include a non-volatile random access memory (NVRAM).

In an embodiment of the present application, by invoking a program or the instruction stored in the memory 204, the processor 201 performs the steps in the method embodiment shown in FIG. 2 or FIG. 3, and the processor 201 is configured to:

send a quality of service QoS request message to a network device, where the QoS request message carries identification information of the terminal;

receive QoS information of the terminal that is sent by the network device based on the identification information of the terminal, where the QoS information includes a message identifier of a V2X message supported by the terminal and a QoS parameter corresponding to the message identifier;

obtain a message identifier of a to-be-sent V2X message;

obtain, based on the QoS information, a QoS parameter corresponding to the message identifier of the to-be-sent V2X message;

obtain, based on the obtained QoS parameter, a radio resource used to send the to-be-sent V2X message; and send the to-be-sent V2X message by using the obtained radio resource.

Optionally, when obtaining, based on the obtained QoS parameter, the radio resource used to send the to-be-sent V2X message, the processor is specifically configured to:

obtain, based on a correspondence between a resource identifier and a QoS parameter, a resource identifier corresponding to the obtained QoS parameter, where the resource identifier in the correspondence is used to identify a pre-allocated radio resource; and determine a radio resource identified by the obtained resource identifier as the radio resource used to send the to-be-sent V2X message.

Optionally, when obtaining, based on the obtained QoS parameter, the radio resource used to send the to-be-sent V2X message, the processor 201 is specifically configured to:

send a resource request message to a base station, where the resource request message carries the obtained QoS parameter, the resource request message is used to request a resource identifier from the base station, and the resource identifier is a resource identifier of the radio resource used to send the to-be-sent V2X message; receive the resource identifier sent by the base station; and determine a radio resource identified by the resource identifier as the radio resource used to send the to-be-sent V2X message.

In another embodiment of the present application, by invoking a program or the instruction stored in the memory 204, the processor 201 may further perform the steps in the method embodiment shown in FIG. 4 or FIG. 5, and the processor 201 is configured to:

obtain a message identifier of a to-be-sent V2X message;

send a resource request message to a base station based on the obtained message identifier, where the resource request message is used to request a resource identifier from the base station, and the resource identifier is a resource identifier of a radio resource used to send the to-be-sent V2X message;

receive the resource identifier sent by the base station; and send the to-be-sent V2X message by using the radio resource identified by the resource identifier.

Optionally, that the processor sends a resource request message to a base station based on the obtained message identifier includes:

determine, based on a correspondence between the message identifier and a bearer identifier, the bearer identifier corresponding to the obtained message identifier; and send the resource request message to the base station by using a radio bearer identified by the determined bearer identifier.

Optionally, when sending the resource request message to the base station based on the obtained message identifier, the processor is specifically configured to:

determine, based on a correspondence between a message identifier of a V2X message supported by the terminal and a bearer identifier of a radio bearer for communication between the terminal and the base station, a bearer identifier corresponding to the obtained message identifier; and send the resource request message to the base station by using a radio bearer identified by the determined bearer identifier.

Figure 21:
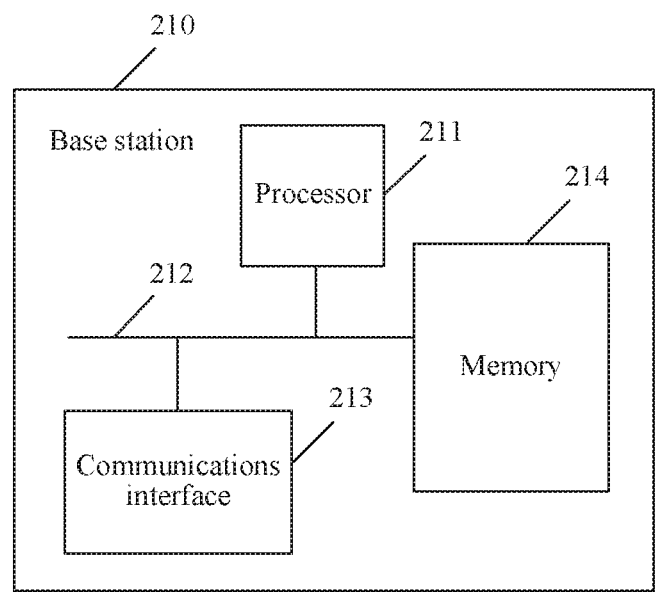
FIG. 21 is a schematic structural diagram of a network device according to an embodiment of the present application.

An embodiment of the present application further provides a network device. As shown in FIG. 21, the network device 210 includes at least one processor 211, at least one bus 212, at least one communications interface 213, and at least one memory 214.

The memory 211 is configured to store a computer executable instruction. The memory 204 may include a read-only memory and a random access memory, and provide an instruction and data to the processor 201. A part of the memory 204 may further include a non-volatile random access memory (NVRAM).

The processor 211, the communications interface 213, and the memory 214 are connected to each other by using the bus 212.

The sending unit and the receiving unit in FIG. 17 and FIG. 18 may be integrated into the communications interface 213 in FIG. 21.

In an embodiment of the present application, when a computer is run, the processor 211 executes the computer executable instruction stored in the memory 214, so that the processor 211 can perform the steps in the embodiment shown in FIG. 6 and the processor 211 is configured to:

receive a quality of service QoS request message sent by a terminal, where the QoS request message carries identification information of the terminal;

obtain quality of service QoS information of the terminal based on the identification information of the terminal, where the QoS information includes a message identifier of a V2X message supported by the terminal and a QoS parameter corresponding to the message identifier; and send the QoS information of the terminal to the terminal.

Optionally, if the network device is a V2X service function entity, the processor is further configured to:

allocate a bearer identifier to the message identifier of the V2X message supported by the terminal, where the bearer identifier is an identifier of a radio bearer for communication between the terminal and the base station; create a correspondence between the message identifier and the bearer identifier; and send the correspondence to the terminal.

Optionally if the network device is an MME, the processor is further configured to:

allocate a radio bearer to the message identifier of the V2X message supported by the terminal in one or more radio bearers for communication between the terminal and the base station, create a correspondence between the message identifier of the V2X message and a bearer identifier of the allocated radio bearer, and send the correspondence to the terminal.

Optionally, if the network device is an MME, when obtaining the QoS information of the terminal based on the identification information of the terminal, the processor is specifically configured to:

send a first request message to a home subscriber server HSS, where the first request message carries the identification information of the terminal; and receive the QoS information sent by the HSS based on the identification information of the terminal.

Optionally, if the network device is a V2X service function entity, when obtaining the QoS information of the terminal based on the identification information of the terminal, the processor is specifically configured to:

if the V2X service function entity locally stores the QoS information of the terminal, obtain the QoS information of the terminal by searching for the locally stored QoS information of the terminal; or if the V2X service function entity does not locally store the QoS information of the terminal, send a first request message to an HSS, where the first request message carries the identification information of the terminal; and receive the QoS information sent by the HSS based on the identification information of the terminal.

In another embodiment of the present application, when a computer is run, the processor 211 executes the computer executable instruction stored in the memory 214, so that the processor 211 can perform the steps in the embodiment shown in FIG. 7 and the processor 211 is configured to:

receive a quality of service QoS request message sent by a terminal, where the QoS request message carries identification information of the terminal;

obtain QoS information of the terminal based on the identification information of the terminal; and send the QoS information of the terminal to a base station, where the QoS information includes a message identifier of a V2X message supported by the terminal and a QoS parameter corresponding to the message identifier.

Optionally, if the network device is a V2X service function entity, the processor is further configured to:

send a correspondence between the message identifier of the V2X message supported by the terminal and a bearer identifier of a radio bearer for communication between the terminal and the base station to the base station.

Optionally, if the network device is an MME, the processor is further configured to:

allocate a radio bearer to the message identifier of the V2X message supported by the terminal in one or more radio bearers for communication between the terminal and the base station, create a correspondence between the message identifier of the V2X message and a bearer identifier of the allocated radio bearer, and send the correspondence to the base station.

Figure 22:
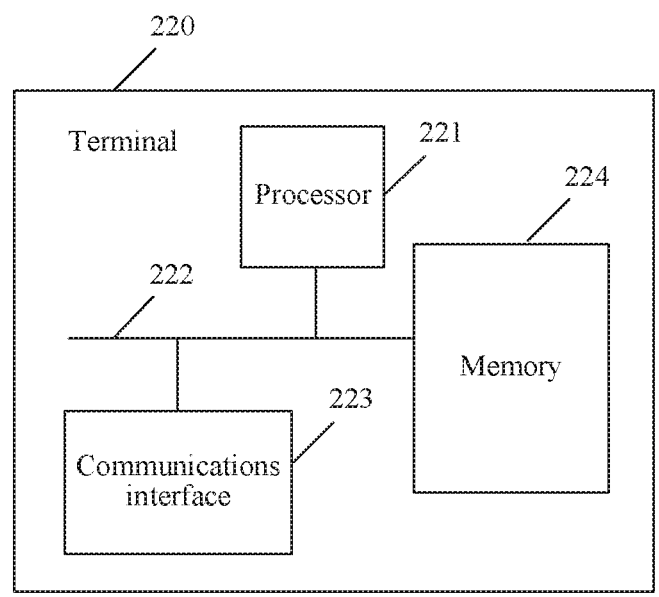
FIG. 22 is a schematic structural diagram of a base station according to an embodiment of the present application.

An embodiment of the present application further provides a base station. As shown in FIG. 22, the base station 220 includes at least one processor 221, at least one bus 222, at least one communications interface 223, and at least one memory 224.

The memory 221 is configured to store a computer executable instruction. The memory 204 may include a read-only memory and a random access memory, and provide an instruction and data to the processor 201. A part of the storage 204 may further include a non-volatile random access memory (NVRAM).

The processor 221, the communications interface 223, and the memory 224 are connected to each other by using the bus 222.

The sending unit and the receiving unit in FIG. 19 may be integrated into the communications interface 223 in FIG. 22. For example, the communications interface 223 may be a radio frequency transceiver. This is not limited.

In an embodiment of the present application, when a computer is run, the processor 221 executes the computer executable instruction stored in the memory 224, so that the processor 211 can perform the steps in the embodiment shown in FIG. 8 and the processor 211 is configured to:

receive a resource request message sent by a terminal, where the resource request message is used to request a radio resource for sending a to-be-sent V2X message of the terminal;

determine, based on the resource request message, the radio resource used to send the to-be-sent V2X message; and send a resource identifier of the determined radio resource to the terminal.

Optionally, the resource request message carries the message identifier of the to-be-sent V2X message.

When determining, based on the resource request message, the radio resource used to send the to-be-sent V2X message, the processor is specifically configured to:

obtain, based on a correspondence between the message identifier of the to-be-sent V2X message and a QoS parameter, the QoS parameter corresponding to the message identifier of the to-be-sent V2X message; and obtain, based on a correspondence between a QoS parameter and a radio resource, a radio resource corresponding to the obtained QoS parameter, and determine the obtained radio resource as the radio resource used to send the to-be-sent V2X message.

Optionally, when determining, based on the resource request message, the radio resource used to send the to-be-sent V2X message, the processor is further configured to:

determine a bearer identifier of a radio bearer used to transmit the resource request message;

obtain, based on a correspondence between a QoS parameter and a bearer identifier of a radio bearer for communication between the terminal and the base station, a QoS parameter corresponding to the determined bearer identifier; and obtain, based on a correspondence between a QoS parameter and a radio resource, a radio resource corresponding to the obtained QoS parameter; and determine the obtained radio resource as the radio resource used to send the to-be-sent V2X message.

In addition, an embodiment of the present application further provides a communications system. The communication system may include a terminal, a base station, and a network device. The terminal may be the terminal shown in FIG. 15 or FIG. 16, the network device may be the MME or the V2X service function entity shown in FIG. 18, and the base station may be the base station shown in FIG. 19.

Sequence numbers of the foregoing processes do not mean execution sequences in various embodiments of the present application. The execution sequences of the processes should be determined based on functions and internal logic of the processes, and should not be construed as any limitation to the implementation processes of the embodiments of the present application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of the present application, "B corresponding to A" indicates that B is associated with A, and B may be determined based on A. However, it should be further understood that determining B based on A does not mean that B is determined based on A only; that is, B may also be determined based on A and/or another information.

A person of ordinary skill in the art may be aware that, in combination with examples of units and algorithm steps described in the embodiments disclosed in this specification, the present application may be implemented by using electronic hardware, computer software, or a combination thereof. To clearly describe interchangeability between the hardware and the software, compositions and steps of each example are generally described based on functions in the foregoing descriptions. Whether the functions are performed by using hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for the purpose of convenient and brief description, for a detailed working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods in the embodiments of the present application. The foregoing storage medium includes: any medium that can store program code, for example, a USB flash drive, a removable hard disk, a read-only memory (ROM), a random access memory (RAM), a magnetic disk, or an optical disc.

It may be understood that, for the brevity and clarity of the application document, technical features and descriptions in one of the foregoing embodiments are applicable to other embodiments, and are not described in detail one by one again in the other embodiments.

The foregoing descriptions are merely specific implementations of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. An Vehicle to Everything (V2X) message communication method, comprising:
   sending, by a terminal, a quality of service (QoS) request message to a network device, wherein the QoS request message carries identification information of the terminal;
   receiving, by the terminal, QoS information of the terminal from the network device, wherein the QoS information comprises a message identifier of a V2X message supported by the terminal and a QoS parameter corresponding to the message identifier;
   obtaining, by the terminal based on the QoS information, a QoS parameter corresponding to a message identifier of a to-be-sent V2X message;
   obtaining, by the terminal based on the obtained QoS parameter, a radio resource for sending the to-be-sent V2X message; and
   sending, by the terminal, the to-be-sent V2X message by using the obtained radio resource.

2. The method according to claim 1, wherein the message identifier comprises:
   at least one of a message type or a message flow template type.

3. The method according to claim 1, wherein the QoS parameter comprises at least one of a priority, a latency, reliability, or a bit rate.

4. The method according to claim 1, wherein the network device is a V2X service function entity or a mobility management entity.

5. The method according to claim 1, wherein obtaining, by the terminal based on the obtained QoS parameter, a radio resource for sending send the to-be-sent V2X message comprises:
   obtaining, by the terminal based on a correspondence between a resource identifier and a QoS parameter, a resource identifier corresponding to the obtained QoS parameter, wherein the resource identifier in the correspondence is used to identify a pre-allocated radio resource; and
   determining, by the terminal, a radio resource identified by the obtained resource identifier as the radio resource used to send the to-be-sent V2X message.

6. The method according to claim 1, wherein obtaining, by the terminal based on the obtained QoS parameter, a radio resource for sending the to-be-sent V2X message comprises:
   sending, by the terminal, a resource request message to a base station, wherein the resource request message carries the obtained QoS para the resource request message is used to request a resource identifier from the base station, and the resource identifier is a resource identifier of the radio resource used to send the to-be-sent V2X message;
   receiving, by the terminal, the resource identifier from the base station; and
   determining, by the terminal, a radio resource identified by the resource identifier as the radio resource used to send the to-be-sent V2X message.

7. An apparatus, comprising:
   a processor; and
   a memory configured to store computer executable instructions which, when executed by the processor, cause the apparatus to:
      send a quality of service (QoS) request message to a network device, wherein the QoS request message carries identification information of a terminal,
      receive QoS information of the terminal from the network device, wherein the QoS information comprises a message identifier of a V2X message supported by the terminal and a QoS parameter corresponding to the message identifier,
      obtain, based on the QoS information, a QoS parameter corresponding to a message identifier of a to-be-sent V2X message,
      obtain, based on the obtained QoS parameter, a radio resource for sending the to-be-sent V2X message, and
      send, the to-be-sent V2X message by using the obtained radio resource.

8. The apparatus according to claim 7, wherein the message identifier comprises at least one of a message type or a message flow template type.

9. The apparatus according to claim 7, wherein the QoS parameter comprises at least one of a priority, a latency, reliability, or a bit rate.

10. The apparatus according to claim 7, wherein the network device is a V2X service function entity or a mobility management entity.

11. The apparatus according to claim 7, wherein to obtain, based on the obtained QoS parameter, a radio resource used to send the to-be-sent V2X message, the computer executable instructions, when executed by the processor, further cause the apparatus to:
    obtain, based on a correspondence between a resource identifier and a QoS parameter, a resource identifier corresponding to the obtained QoS parameter, wherein the resource identifier in the correspondence is for identifying a pre-allocated radio resource; and
    determine a radio resource identified by the obtained resource identifier as the radio resource to be used to send the to-be-sent V2X message.

12. The apparatus according to claim 7, wherein to obtain, based on the obtained QoS parameter, a radio resource used to send the to-be-sent V2X message, the computer executable instructions, when executed by the processor, further cause the apparatus to:
    send a resource request message carrying the obtained QoS parameter to a base station for requesting a resource identifier from the base station, and wherein the resource identifier is a resource identifier of the radio resource to be used to send the to-be-sent V2X message;
    receive the resource identifier from the base station; and
    determine a radio resource identified by the resource identifier as the radio resource to be used to send the to-be-sent V2X message.

13. An apparatus, comprising:

a processor; and a memory configured to store computer executable instructions which, when executed by the processor, cause the apparatus to:

receive a quality of service (QoS) request message from a terminal, wherein the QoS request message carries identification information of the terminal, obtain QoS information of the terminal based on the identification information of the terminal, wherein the QoS information comprises a message identifier of a V2X message supported by the terminal and a QoS parameter corresponding to the message identifier, and send the QoS information of the terminal to the terminal.

14. The apparatus according to claim 13, wherein the message identifier comprises at least one of a message type or a message flow template type.

15. The apparatus according to claim 13, wherein the QoS parameter comprises at least one of a priority, a latency, reliability, or a bit rate.

16. The apparatus according to claim 13, wherein the apparatus is a V2X service function entity or a mobility management entity.

17. The apparatus according to claim 13, wherein:

the apparatus is a V2X service function entity; and the computer executable instructions, when executed by the processor, further cause the apparatus to:

send a correspondence between the message identifier of the V2X message supported by the terminal and a bearer identifier of a radio bearer for communication between the terminal and a base station.

18. The apparatus according to claim 13, wherein:

the apparatus is a V2X service function entity; and to obtain QoS information of the terminal based on the identification information of the terminal, the computer executable instructions, when executed by the processor, cause the apparatus to:

when the V2X service function entity locally stores the QoS information of the terminal, obtain the QoS information of the terminal by searching for the locally stored QoS information of the terminal, or when the V2X service function entity does not locally store the QoS information of the terminal, send a first request message to a home subscriber server (HSS), wherein the first request message carries the identification information of the terminal, and receive the QoS information from the HSS.

* * * * *

UNITED STATES PATENT AND TRADEMARK OFFICE
CERTIFICATE OF CORRECTION

PATENT NO. : 10,716,123 B2
APPLICATION NO. : 16/207639
DATED : July 14, 2020
INVENTOR(S) : Qiang Deng Page 1 of 1

It is certified that error appears in the above-identified patent and that said Letters Patent is hereby corrected as shown below:

On the Title Page

Item (56), in Column 2, in the Other Publications section, Line 1, delete "Implmenting" and insert -- Implementing --, therefor.

Signed and Sealed this
Twenty-ninth Day of December, 2020

Andrei Iancu
*Director of the United States Patent and Trademark Office*